(12) United States Patent
Holten-Andersen et al.

(10) Patent No.: US 11,591,442 B2
(45) Date of Patent: Feb. 28, 2023

(54) MATERIALS WITH PROGRAMMABLE PROPERTIES CONTROLLED BY LIGHT

(71) Applicant: Massachusetts Institute of Technology, Cambridge, MA (US)

(72) Inventors: Niels Holten-Andersen, Quincy, MA (US); Scott Charles Grindy, Newton, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 460 days.

(21) Appl. No.: 16/613,861

(22) PCT Filed: May 17, 2018

(86) PCT No.: PCT/US2018/033240
§ 371 (c)(1),
(2) Date: Nov. 15, 2019

(87) PCT Pub. No.: WO2018/213614
PCT Pub. Date: Nov. 22, 2018

(65) Prior Publication Data
US 2020/0199303 A1 Jun. 25, 2020

Related U.S. Application Data

(60) Provisional application No. 62/508,244, filed on May 18, 2017.

(51) Int. Cl.
C08J 3/075 (2006.01)
C08J 3/24 (2006.01)
(52) U.S. Cl.
CPC ............... *C08J 3/075* (2013.01); *C08J 3/24* (2013.01); *C08J 2371/02* (2013.01)

(58) Field of Classification Search
CPC ............ C08J 3/075; C08J 3/24; C08J 2371/02
See application file for complete search history.

(56) References Cited

U.S. PATENT DOCUMENTS

2013/0146821 A1    6/2013   Meyer et al.

OTHER PUBLICATIONS

International Search Report and Written Opinion for International Application No. PCT/US2018/033240 dated Aug. 28, 2018.
Grindy et al., Bio-inspired metal-coordinate hydrogels with programmable viscoelastic material functions controlled by longwave UV light. Soft Matter. Jun. 7, 2017;13(22):4057-4065. doi: 10.1039/c7sm00617a.
Narayanan et al., Photodegradable iron(III) cross-linked alginate gels. Biomacromolecules. Aug. 13, 2012;13(8):2465-71. doi: 10.1021/bm300707a. Epub Jul. 25, 2012.

(Continued)

*Primary Examiner* — Andrew J. Oyer
(74) *Attorney, Agent, or Firm* — Wolf, Greenfield & Sacks, P.C.

(57) ABSTRACT

Disclosed are methods, compositions, reagents, systems, and kits to prepare materials with viscoelastic properties that respond to irradiation with light. Various embodiments show that bio-inspired histidine:transition metal ion complexes allow precise and tunable control over the viscoelastic properties of polymer networks containing these types of crosslinks pre and post-irradiation. These materials have the potential to aid biomedical materials scientists in the development of materials with specific stress-relaxing or energy-dissipating properties.

23 Claims, 11 Drawing Sheets

(56) References Cited

OTHER PUBLICATIONS

Wegner et al., Cobalt Cross-Linked Redox-Responsive PEG Hydrogels: From Viscoelastic Liquids to Elastic Solids. Macromolecules. 2016;49(11):4229-4235.

Fullenkamp et al., Mussel-inspired histidine-based transient network metal coordination hydrogels. Macromolecules. Feb. 12, 2013;46(3):1167-1174. doi: 10.1021/ma301791n. Epub Jan. 18, 2013. PMID: 23441102; PMCID: PMC3579674.

Grindy et al., Control of hierarchical polymer mechanics with bioinspired metal-coordination dynamics. Nat Mater. Dec. 2015;14(12):1210-6. doi: 10.1038/nmat4401. Epub Aug. 31, 2015. PMID: 26322715; PMCID: PMC4654658.

MATERIALS WITH PROGRAMMABLE PROPERTIES CONTROLLED BY LIGHT

RELATED APPLICATIONS

This application is a national stage filing under 35 U.S.C. § 371 of International Patent Application No. PCT/US2018/033240, filed May 17, 2018, which claims priority under 35 U.S.C. § 119(e) to U.S. Provisional Application, U.S. Ser. No. 62/508,244, filed May 18, 2017, each of which is incorporated herein by reference.

GOVERNMENT SUPPORT

This invention was made with government support under grant number DMR-1419807 awarded by the National Science Foundation. The government has certain rights in the invention.

BACKGROUND OF THE INVENTION

Polymer networks (i.e., hydrogels) are at present explored in a variety of biomedical applications, including synthetic cartilage, subcutaneous drug delivery, biomechanical actuators, tissue scaffolds, and injectable wound-healing materials (see, e.g., Kopecek, *Biomaterials*, 2007, 28, 5185-5192; Thiele et al., *Adv. Mater.*, 2013, 26, 125-148). Since conventional, covalently crosslinked hydrogels are typically mechanically weak, and strategies for optimizing their properties are limited, researchers have recently turned to creating viscoelastic hydrogels with diverse supramolecular architectures wherein the dominant interactions between polymer chains are dynamic and reversible. This research has lead to new hydrogels with viscoelastic properties that afford vastly improved mechanical strength and toughness over conventional hydrogels, and additional functions such as stimuli-responsiveness or biodegradability can now be included by proper engineering of the supramolecular interactions. A vast array of supramolecular chemistries already exist, including ionic interactions (see, e.g., Gong et al., *Advanced Materials*, 2003, 15, 1155-1158; Sun et al., *Nature*, 2012, 489, 133-136; Yang et al., *ACS Applied Materials & Interfaces*, 2013, 5, 10418-10422; Narita et al., *Macromolecules*, 2013, 46, 4174-4183), hydrophobic associations (see, e.g. Annable et al., *Journal of Rheology*, 1993, 37, 695; Kondo et al., *Advanced Materials*, 2015, 27, 7407-7411), adaptable covalent bonds (see, e.g., Mckinnon et al., *Advanced Materials*, 2014, 26, 865-872), hydrogen bonds, protein-inspired associating domains (see, e.g. Glassman et al., *Advanced Functional Materials*, 2013, 23, 1182-1193; Glassman et al., *Soft Matter*, 2013, 9, 6814), host-guest complexes (see, e.g., Appel et al., *Angewandte Chemie International Edition*, 2014, 53, 10038-10043), or metal-ligand coordination (see, e.g., Grindy et al., *Nature Materials*, 2015, 14, 1210-1216; Rossow et al., *Polymer Chemistry*, 2014, 5, 3018-3029; Yount et al., *Journal of the American Chemical Society*, 2003, 125, 15302-15303; Loveless et al., *Macromolecules*, 2005, 38, 10171-10177; Yount et al., *Journal of the American Chemical Society*, 2005, 127, 14488-14496). Each of these strategies to design supramolecular networks have varying advantages and disadvantages in ease and efficiency of synthesis, possible mechanical property design space, and responsiveness to various stimuli, such as heat, light, or (bio)chemical cues (see, e.g. Zhao, *Soft Matter*, 2014, 10, 672-687).

SUMMARY OF THE INVENTION

Designing materials with specific viscoelastic properties a priori remains a more challenging task than designing materials with specific elastic properties because instead of optimizing the elastic modulus as a static materials property, one must engineer the material functions of the complex modulus $G^*(\omega)$ or relaxation modulus $G(t)$ across orders of magnitude in frequency and/or time (see, e.g., Bharadwaj et al., Volume 3A: 39th Design Automation Conference, 2013, p. V03AT03A058). In addition, modifying a material's chemistry to optimize one part of the material function (i.e., low frequencies or long timescales) may have deleterious effects on another part of the material function (i.e., high frequencies or short timescales). The main challenge, therefore, lies in learning how to engineer a specific viscoelastic material function rather than a single scalar materials property. Therefore, a significant advancement would be the demonstration and development of materials engineered with specific viscoelastic material functions.

Published work has shown that in a four-arm polyethylene glycol based hydrogel crosslinked by mussel-inspired histidine:$M^{2+}$ coordinate bonds (4PEG-His:$M^{2+}$), the characteristic energy dissipation timescale can be controlled by selecting the transition metal ion acting as the crosslink center (see, e.g., Fullenkamp et al., *Macromolecules*, 2013, 46, 1167-1174). In addition, it has been shown that the use of more than one transition metal allows for the design of hydrogels with multiple hierarchical mechanical energy dissipation timescales, while controlling the magnitude of the individual dissipation modes by varying the relative metal concentrations (see, e.g., Grindy et al., *Nature Materials*, 2015, 14, 1210-1216). This platform of using metal-crosslinked hydrogels (e.g., 4PEG-His:$M^{2+}$) represents a synthetically straightforward method for creating hydrogels with precisely-engineered viscoelastic properties, and therefore a materials platform where different parts of the viscoelastic material function may be modified in an independent or quasi-independent fashion.

Methods, compositions, systems, and kits that allow for the preparation of polymer networks (i.e., metal-crosslinked hydrogels) resulting from the switch of one or more material properties in a facile manner are disclosed herein. Specifically, the preparation of metal-crosslinked hydrogels, wherein the oxidation state of metal can be controlled by an external stimulus to alter viscoelastic properties is disclosed. In certain embodiments, the oxidation state of the metal ions is altered by free radicals generated from the photo-dissociation, bond homolysis due to the absorption of energy from light irradiation, of a photoinitiator. Adjusting the oxidation state of the metal ions dramatically alters the viscoelastic properties of metal-crosslinked hydrogels. In certain embodiments, the hydrogel is comprised of a four-arm polyethylene glycol polymer with the end of each arm functionalized with a histidine moiety (4PEG-His hydrogels).

In a broad sense, a polymer network, consisting of multi-arm polymers with the ends of each arm functionalized with ligand moieties capable of forming reversible bonds with metals, undergoes changes to materials properties upon oxidation and/or reduction of one or more of the metals. In certain embodiments, the oxidation and/or reduction reactions result from reactions with free radicals generated by photo-dissociation of a photoinitiator by ultraviolet (UV) irradiation. These hydrogel products may include a single metal or a combination of different metal ions (e.g., 1, 2, 3, 4, 5, or more) of varying proportions.

In certain embodiments, the present disclosure provides methods for altering the properties of a polymer network (e.g., metal-crosslinked hydrogels) comprising exposing the polymer network to light in the presence of a photoinitiator;

wherein the polymer network is comprised of polymers non-covalently crosslinked by coordination of the polymers to metals (e.g., copper, nickel, cobalt); and wherein the metals undergo oxidation and/or reduction upon exposure to light in the presence of the photoinitiator. In certain embodiments, the arms of the polymer consists of polymers selected from a group consisting of polyethylene glycol, poly(D,L-lactide), polyglycolide, poly(ε-caprolactone), polyethylene, and polypropylene glycol. In certain embodiments, the polymer comprises polyethylene glycol. In certain embodiment, the resulting polymer network forms a hydrogel.

In certain embodiment, the altered material properties are selected from the group consisting of stiffness, toughness, viscosity, elasticity, energy dissipation, dynamic modulus, complex modulus, storage modulus, loss modulus, plateau modulus, and relaxation time.

In certain embodiment, the polymers are of the formula:

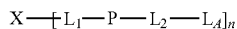

wherein: X is carbon, silicon, nitrogen, oxygen, sulfur, optionally substituted alkyl, optionally substituted heteroalkyl, optionally substituted carbocyclyl, optionally substituted heterocyclyl, optionally substituted aryl, optionally substituted heteroaryl, optionally substituted alkoxy, or a combination thereof, each $L_1$ and $L_2$ are independently substituted or unsubstituted, cyclic or acyclic, branched or unbranched aliphatic; substituted or unsubstituted, cyclic or acyclic, branched or unbranched heteroaliphatic; substituted or unsubstituted aryl; or substituted or unsubstituted heteroaryl, or a combination thereof; each P is independently a linear or branched, homopolymer or copolymer, or a combination thereof, having a number average molecular weight of about 100 Da to 60000 Da; each $L_A$ is independently a ligand moiety that coordinates to a metal (For an example of a histidine moiety coordinated to a metal, see FIG. 1); and n is an integer between 2 and 4, inclusive. In certain embodiments, the polymers are multi-arm polymers. In certain embodiment, the polymers are two-arm polymers. In certain embodiment, the polymers are three-arm polymers. In certain embodiment, the polymers are four-arm polymers.

In certain embodiments, $L_A$ is selected from the group consisting of proteins, polysaccharides, nucleic acids, amino acids, organic diacids, polypeptides, amines, thiols, ethers, alcohols, polyacids, polyamines, heterocycles, and heteroaryls.

In certain embodiments, the photoinitiator undergoes photo-dissociation to generate free radicals upon exposure to light irradiation. In certain embodiments, the photo-dissociation of lithium phenyl-2,4,6-trimethylbenzoylphosphinate (LAP) generates free radicals upon UV irradiation. The free radicals are capable of effecting oxidation and/or reduction of metals. In certain embodiments, the radicals effect multi-electron reduction and/or multi-electron oxidation of metals. In certain embodiments, the radicals effect single-electron reduction and/or single-electron oxidation of metals.

In another embodiment, the present disclosure provides methods to prepare a polymer network comprising the steps of: providing a substrate polymer network comprised of non-covalently crosslinked by coordination of the polymers to metals; contacting the substrate polymer network with a photoinitiator to form a mixture; and irradiating the mixture with light; whereby the irradiation results in a change in the oxidation state of the metal.

In yet another embodiment, the present disclosure describes kits comprising: a polymer network of multi-arm polymers covalently bound to ligand moieties which are coordinated with one or more metals; a photoinitiator; and optionally, instructions for use. In certain embodiments, kits comprise of a polymer network of multi-arm polymers covalently bound to ligand moieties which are coordinated with one or more metals; one or more metals; a photoinitiator; and optionally, instructions for use. In certain embodiments, kits comprise of multi-arm polymers covalently bound to a terminal group selected from the group consisting of halogen, optionally substituted alkenyl, optionally substituted alkynyl, optionally substituted heterocyclyl, optionally substituted aryl, optionally substituted heteroaryl, optionally substituted acyl, optionally substituted hydroxyl, optionally substituted amino, and optionally substituted thio; one or more reagents; one or more reactants; one or more metals; a photoinitiator; and optionally, instructions for use. In certain embodiments, the kits further comprise a light source.

The present disclosure also provides uses of polymer networks. For example, the present disclosure provides uses of these polymer networks toward applications, such as the design of adhesives, biomaterials, and coatings.

The details of certain embodiments of the invention are set forth in the Detailed Description of Certain Embodiments, as described below. Other features, objects, and advantages of the invention will be apparent from the Definitions, Figures, Examples, and Claims.

Definitions

Definitions of specific functional groups and chemical terms are described in more detail below. The chemical elements are identified in accordance with the Periodic Table of the Elements, CAS version, *Handbook of Chemistry and Physics*, 75$^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March, *March's Advanced Organic Chemistry*, 5$^{th}$ Edition, John Wiley & Sons, Inc., New York, 2001; Larock, *Comprehensive Organic Transformations*, VCH Publishers, Inc., New York, 1989; and Carruthers, *Some Modern Methods of Organic Synthesis*, 3$^{rd}$ Edition, Cambridge University Press, Cambridge, 1987.

Compounds described herein can comprise one or more asymmetric centers, and thus can exist in various stereoisomeric forms, e.g., enantiomers and/or diastereomers. For example, the compounds described herein can be in the form of an individual enantiomer, diastereomer or geometric isomer, or can be in the form of a mixture of stereoisomers, including racemic mixtures and mixtures enriched in one or more stereoisomer. Isomers can be isolated from mixtures by methods known to those skilled in the art, including chiral high pressure liquid chromatography (HPLC) and the formation and crystallization of chiral salts; or preferred isomers can be prepared by asymmetric syntheses. See, for example, Jacques et al., *Enantiomers, Racemates and Resolutions* (Wiley Interscience. New York, 1981); Wilen et al., *Tetrahedron* 33:2725 (1977); Eliel, E. L. *Stereochemistry of Carbon Compounds* (McGraw-Hill, N Y, 1962); and Wilen, S. H., *Tables of Resolving Agents and Optical Resolutions* p. 268 (E. L. Eliel, Ed., Univ. of Notre Dame Press, Notre Dame, Ind. 1972). The invention additionally encompasses compounds as individual isomers substantially free of other isomers, and alternatively, as mixtures of various isomers.

Unless otherwise stated, structures depicted herein are also meant to include compounds that differ only in the presence of one or more isotopically enriched atoms. For example, compounds having the present structures except for the replacement of hydrogen by deuterium or tritium, replacement of $^{19}$F with $^{18}$F, or the replacement of $^{12}$C with $^{13}$C or $^{14}$C are within the scope of the disclosure.

The term "aliphatic" refers to alkyl, alkenyl, alkynyl, and carbocyclic groups. Likewise, the term "heteroaliphatic" refers to heteroalkyl, heteroalkenyl, heteroalkynyl, and heterocyclic groups.

The term "alkyl" refers to a radical of a straight-chain or branched saturated hydrocarbon group having from 1 to 10 carbon atoms ("$C_{1-10}$ alkyl"). In some embodiments, an alkyl group has 1 to 9 carbon atoms ("$C_{1-9}$ alkyl"). In some embodiments, an alkyl group has 1 to 8 carbon atoms ("$C_{1-8}$ alkyl"). In some embodiments, an alkyl group has 1 to 7 carbon atoms ("$C_{1-7}$ alkyl"). In some embodiments, an alkyl group has 1 to 6 carbon atoms ("$C_{1-6}$ alkyl"). In some embodiments, an alkyl group has 1 to 5 carbon atoms ("$C_{1-5}$ alkyl"). In some embodiments, an alkyl group has 1 to 4 carbon atoms ("$C_{1-4}$ alkyl"). In some embodiments, an alkyl group has 1 to 3 carbon atoms ("$C_{1-3}$ alkyl"). In some embodiments, an alkyl group has 1 to 2 carbon atoms ("$C_{1-2}$ alkyl"). In some embodiments, an alkyl group has 1 carbon atom ("$C_1$ alkyl"). In some embodiments, an alkyl group has 2 to 6 carbon atoms ("$C_{2-6}$ alkyl"). Examples of $C_{1-6}$ alkyl groups include methyl ($C_1$), ethyl ($C_2$), propyl ($C_3$) (e.g., n-propyl, isopropyl), butyl ($C_4$) (e.g., n-butyl, tert-butyl, sec-butyl, iso-butyl), pentyl ($C_5$) (e.g., n-pentyl, 3-pentanyl, amyl, neopentyl, 3-methyl-2-butanyl, tertiary amyl), and hexyl ($C_6$) (e.g., n-hexyl). Additional examples of alkyl groups include n-heptyl ($C_7$), n-octyl ($C_8$), and the like. Unless otherwise specified, each instance of an alkyl group is independently unsubstituted (an "unsubstituted alkyl") or substituted (a "substituted alkyl") with one or more substituents (e.g., halogen, such as F). In certain embodiments, the alkyl group is an unsubstituted $C_{1-10}$ alkyl (such as unsubstituted $C_{1-6}$ alkyl, e.g., —$CH_3$ (Me), unsubstituted ethyl (Et), unsubstituted propyl (Pr, e.g., unsubstituted n-propyl (n-Pr), unsubstituted isopropyl (i-Pr)), unsubstituted butyl (Bu, e.g., unsubstituted n-butyl (n-Bu), unsubstituted tert-butyl (tert-Bu or t-Bu), unsubstituted sec-butyl (sec-Bu), unsubstituted isobutyl (i-Bu)). In certain embodiments, the alkyl group is a substituted $C_{1-10}$ alkyl (such as substituted $C_{1-6}$ alkyl, e.g., —$CF_3$, Bn).

The term "heteroalkyl" refers to an alkyl group, which further includes at least one heteroatom (e.g., 1, 2, 3, or 4 heteroatoms) selected from oxygen, nitrogen, or sulfur within (i.e., inserted between adjacent carbon atoms of) and/or placed at one or more terminal position(s) of the parent chain. In certain embodiments, a heteroalkyl group refers to a saturated group having from 1 to 10 carbon atoms and 1 or more heteroatoms within the parent chain ("heteroC$_{1-10}$ alkyl"). In some embodiments, a heteroalkyl group is a saturated group having 1 to 9 carbon atoms and 1 or more heteroatoms within the parent chain ("heteroC$_{1-9}$ alkyl"). In some embodiments, a heteroalkyl group is a saturated group having 1 to 8 carbon atoms and 1 or more heteroatoms within the parent chain ("heteroC$_{1-8}$ alkyl"). In some embodiments, a heteroalkyl group is a saturated group having 1 to 7 carbon atoms and 1 or more heteroatoms within the parent chain ("heteroC$_{1-7}$ alkyl"). In some embodiments, a heteroalkyl group is a saturated group having 1 to 6 carbon atoms and 1 or more heteroatoms within the parent chain ("heteroC$_{1-6}$ alkyl"). In some embodiments, a heteroalkyl group is a saturated group having 1 to 5 carbon atoms and 1 or 2 heteroatoms within the parent chain ("heteroC$_{1-5}$ alkyl"). In some embodiments, a heteroalkyl group is a saturated group having 1 to 4 carbon atoms and 1 or 2 heteroatoms within the parent chain ("heteroC$_{1-4}$ alkyl"). In some embodiments, a heteroalkyl group is a saturated group having 1 to 3 carbon atoms and 1 heteroatom within the parent chain ("heteroC$_{1-3}$ alkyl"). In some embodiments, a heteroalkyl group is a saturated group having 1 to 2 carbon atoms and 1 heteroatom within the parent chain ("heteroC$_{1-2}$ alkyl"). In some embodiments, a heteroalkyl group is a saturated group having 1 carbon atom and 1 heteroatom ("heteroC$_1$ alkyl"). In some embodiments, a heteroalkyl group is a saturated group having 2 to 6 carbon atoms and 1 or 2 heteroatoms within the parent chain ("heteroC$_{2-6}$ alkyl"). Unless otherwise specified, each instance of a heteroalkyl group is independently unsubstituted (an "unsubstituted heteroalkyl") or substituted (a "substituted heteroalkyl") with one or more substituents. In certain embodiments, the heteroalkyl group is an unsubstituted heteroC$_{1-10}$ alkyl. In certain embodiments, the heteroalkyl group is a substituted heteroC$_{1-10}$ alkyl.

The term "alkenyl" refers to a radical of a straight-chain or branched hydrocarbon group having from 2 to 10 carbon atoms and one or more carbon-carbon double bonds (e.g., 1, 2, 3, or 4 double bonds). In some embodiments, an alkenyl group has 2 to 9 carbon atoms ("$C_{2-9}$ alkenyl"). In some embodiments, an alkenyl group has 2 to 8 carbon atoms ("$C_{2-8}$ alkenyl"). In some embodiments, an alkenyl group has 2 to 7 carbon atoms ("$C_{2-7}$ alkenyl"). In some embodiments, an alkenyl group has 2 to 6 carbon atoms ("$C_{2-6}$ alkenyl"). In some embodiments, an alkenyl group has 2 to 5 carbon atoms ("$C_{2-5}$ alkenyl"). In some embodiments, an alkenyl group has 2 to 4 carbon atoms ("$C_{2-4}$ alkenyl"). In some embodiments, an alkenyl group has 2 to 3 carbon atoms ("$C_{2-3}$ alkenyl"). In some embodiments, an alkenyl group has 2 carbon atoms ("$C_2$ alkenyl"). The one or more carbon-carbon double bonds can be internal (such as in 2-butenyl) or terminal (such as in 1-butenyl). Examples of $C_{2-4}$ alkenyl groups include ethenyl ($C_2$), 1-propenyl ($C_3$), 2-propenyl ($C_3$), 1-butenyl ($C_4$), 2-butenyl ($C_4$), butadienyl ($C_4$), and the like. Examples of $C_{2-6}$ alkenyl groups include the aforementioned $C_{2-4}$ alkenyl groups as well as pentenyl ($C_5$), pentadienyl ($C_5$), hexenyl ($C_6$), and the like. Additional examples of alkenyl include heptenyl ($C_7$), octenyl ($C_8$), octatrienyl ($C_8$), and the like. Unless otherwise specified, each instance of an alkenyl group is independently unsubstituted (an "unsubstituted alkenyl") or substituted (a "substituted alkenyl") with one or more substituents. In certain embodiments, the alkenyl group is an unsubstituted $C_{2-10}$ alkenyl. In certain embodiments, the alkenyl group is a substituted $C_{2-10}$ alkenyl. In an alkenyl group, a C=C double bond for which the stereochemistry is not specified (e.g., —CH=CHCH$_3$ or

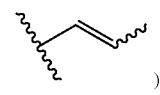
)

may be an (E)- or (Z)-double bond.

The term "alkynyl" refers to a radical of a straight-chain or branched hydrocarbon group having from 2 to 10 carbon atoms and one or more carbon-carbon triple bonds (e.g., 1, 2, 3, or 4 triple bonds) ("$C_{2-10}$ alkynyl"). In some embodiments, an alkynyl group has 2 to 9 carbon atoms ("$C_{2-9}$ alkynyl"). In some embodiments, an alkynyl group has 2 to 8 carbon atoms ("$C_{2-8}$ alkynyl"). In some embodiments, an alkynyl group has 2 to 7 carbon atoms ("$C_{2-7}$ alkynyl"). In some embodiments, an alkynyl group has 2 to 6 carbon atoms ("$C_{2-6}$ alkynyl"). In some embodiments, an alkynyl group has 2 to 5 carbon atoms ("$C_{2-5}$ alkynyl"). In some embodiments, an alkynyl group has 2 to 4 carbon atoms ("$C_{2-4}$ alkynyl"). In some embodiments, an alkynyl group has 2 to 3 carbon atoms ("$C_{2-3}$ alkynyl"). In some embodiments, an alkynyl group has 2 carbon atoms ("$C_2$ alkynyl"). The one or more carbon-carbon triple bonds can be internal (such as in 2-butynyl) or terminal (such as in 1-butynyl). Examples of $C_{2-4}$ alkynyl groups include, without limitation, ethynyl ($C_2$), 1-propynyl ($C_3$), 2-propynyl ($C_3$), 1-butynyl ($C_4$), 2-butynyl ($C_4$), and the like. Examples of $C_{2-6}$ alkenyl groups include the aforementioned $C_{2-4}$ alkynyl groups as well as pentynyl ($C_5$), hexynyl ($C_6$), and the like. Additional examples of alkynyl include heptynyl ($C_7$), octynyl ($C_8$), and the like. Unless otherwise specified, each instance of an alkynyl group is independently unsubstituted (an "unsubstituted alkynyl") or substituted (a "substituted alkynyl") with one or more substituents. In certain embodiments, the alkynyl group is an unsubstituted $C_{2-10}$ alkynyl. In certain embodiments, the alkynyl group is a substituted $C_{2-10}$ alkynyl.

The term "carbocyclyl" or "carbocyclic" refers to a radical of a non-aromatic cyclic hydrocarbon group having from 3 to 14 ring carbon atoms ("$C_{3-14}$ carbocyclyl") and zero heteroatoms in the non-aromatic ring system. In some embodiments, a carbocyclyl group has 3 to 10 ring carbon atoms ("$C_{3-10}$ carbocyclyl"). In some embodiments, a carbocyclyl group has 3 to 8 ring carbon atoms ("$C_{3-8}$ carbocyclyl"). In some embodiments, a carbocyclyl group has 3 to 7 ring carbon atoms ("$C_{3-7}$ carbocyclyl"). In some embodiments, a carbocyclyl group has 3 to 6 ring carbon atoms ("$C_{3-6}$ carbocyclyl"). In some embodiments, a carbocyclyl group has 4 to 6 ring carbon atoms ("$C_{4-6}$ carbocyclyl"). In some embodiments, a carbocyclyl group has 5 to 6 ring carbon atoms ("$C_{5-6}$ carbocyclyl"). In some embodiments, a carbocyclyl group has 5 to 10 ring carbon atoms ("$C_{5-10}$ carbocyclyl"). Exemplary $C_{3-6}$ carbocyclyl groups include, without limitation, cyclopropyl ($C_3$), cyclopropenyl ($C_3$), cyclobutyl ($C_4$), cyclobutenyl ($C_4$), cyclopentyl ($C_5$), cyclopentenyl ($C_5$), cyclohexyl ($C_6$), cyclohexenyl ($C_6$), cyclohexadienyl ($C_6$), and the like. Exemplary $C_{3-8}$ carbocyclyl groups include, without limitation the aforementioned $C_{3-6}$ carbocyclyl groups as well as cycloheptyl ($C_7$), cycloheptenyl ($C_7$), cycloheptadienyl ($C_7$), cycloheptatrienyl ($C_7$), cyclooctyl ($C_8$), cyclooctenyl ($C_8$), bicyclo[2.2.1]heptanyl ($C_7$), bicyclo[2.2.2]octanyl ($C_8$), and the like. Exemplary $C_{3-10}$ carbocyclyl groups include, without limitation, the aforementioned $C_{3-8}$ carbocyclyl groups as well as cyclononyl ($C_9$), cyclononenyl ($C_9$), cyclodecyl ($C_{10}$), cyclodecenyl ($C_{10}$), octahydro-1H-indenyl ($C_9$), decahydronaphthalenyl ($C_{10}$), spiro[4.5]decanyl ($C_{10}$), and the like. As the foregoing examples illustrate, in certain embodiments, the carbocyclyl group is either monocyclic ("monocyclic carbocyclyl") or polycyclic (e.g., containing a fused, bridged or spiro ring system such as a bicyclic system ("bicyclic carbocyclyl") or tricyclic system ("tricyclic carbocyclyl")) and can be saturated or can contain one or more carbon-carbon double or triple bonds. "Carbocyclyl" also includes ring systems wherein the carbocyclyl ring, as defined above, is fused with one or more aryl or heteroaryl groups wherein the point of attachment is on the carbocyclyl ring, and in such instances, the number of carbons continue to designate the number of carbons in the carbocyclic ring system. Unless otherwise specified, each instance of a carbocyclyl group is independently unsubstituted (an "unsubstituted carbocyclyl") or substituted (a "substituted carbocyclyl") with one or more substituents. In certain embodiments, the carbocyclyl group is an unsubstituted $C_{3-14}$ carbocyclyl. In certain embodiments, the carbocyclyl group is a substituted $C_{3-14}$ carbocyclyl.

In some embodiments, "carbocyclyl" is a monocyclic, saturated carbocyclyl group having from 3 to 14 ring carbon atoms ("$C_{3-14}$ cycloalkyl"). In some embodiments, a cycloalkyl group has 3 to 10 ring carbon atoms ("$C_{3-10}$ cycloalkyl"). In some embodiments, a cycloalkyl group has 3 to 8 ring carbon atoms ("$C_{3-8}$ cycloalkyl"). In some embodiments, a cycloalkyl group has 3 to 6 ring carbon atoms ("$C_{3-6}$ cycloalkyl"). In some embodiments, a cycloalkyl group has 4 to 6 ring carbon atoms ("$C_{4-6}$ cycloalkyl"). In some embodiments, a cycloalkyl group has 5 to 6 ring carbon atoms ("$C_{5-10}$ cycloalkyl"). In some embodiments, a cycloalkyl group has 5 to 10 ring carbon atoms ("$C_{5-10}$ cycloalkyl"). Examples of $C_{5-6}$ cycloalkyl groups include cyclopentyl ($C_5$) and cyclohexyl ($C_5$). Examples of $C_{3-6}$ cycloalkyl groups include the aforementioned $C_{5-6}$ cycloalkyl groups as well as cyclopropyl ($C_3$) and cyclobutyl ($C_4$). Examples of $C_{3-8}$ cycloalkyl groups include the aforementioned $C_{3-6}$ cycloalkyl groups as well as cycloheptyl ($C_7$) and cyclooctyl ($C_8$). Unless otherwise specified, each instance of a cycloalkyl group is independently unsubstituted (an "unsubstituted cycloalkyl") or substituted (a "substituted cycloalkyl") with one or more substituents. In certain embodiments, the cycloalkyl group is an unsubstituted $C_{3-14}$ cycloalkyl. In certain embodiments, the cycloalkyl group is a substituted $C_{3-14}$ cycloalkyl. In certain embodiments, the carbocyclyl includes 0, 1, or 2 C=C double bonds in the carbocyclic ring system, as valency permits.

The term "heterocyclyl" or "heterocyclic" refers to a radical of a 3- to 14-membered non-aromatic ring system having ring carbon atoms and 1 to 4 ring heteroatoms, wherein each heteroatom is independently selected from nitrogen, oxygen, and sulfur ("3-14 membered heterocyclyl"). In heterocyclyl groups that contain one or more nitrogen atoms, the point of attachment can be a carbon or nitrogen atom, as valency permits. A heterocyclyl group can either be monocyclic ("monocyclic heterocyclyl") or polycyclic (e.g., a fused, bridged or spiro ring system such as a bicyclic system ("bicyclic heterocyclyl") or tricyclic system ("tricyclic heterocyclyl")), and can be saturated or can contain one or more carbon-carbon double or triple bonds. Heterocyclyl polycyclic ring systems can include one or more heteroatoms in one or both rings. "Heterocyclyl" also includes ring systems wherein the heterocyclyl ring, as defined above, is fused with one or more carbocyclyl groups wherein the point of attachment is either on the carbocyclyl or heterocyclyl ring, or ring systems wherein the heterocyclyl ring, as defined above, is fused with one or more aryl or heteroaryl groups, wherein the point of attachment is on the heterocyclyl ring, and in such instances, the number of ring members continue to designate the number of ring members in the heterocyclyl ring system. Unless otherwise specified, each instance of heterocyclyl is independently unsubstituted (an "unsubstituted heterocyclyl") or substituted (a "substituted heterocyclyl") with one or more substituents. In certain embodiments, the heterocyclyl group is an unsubstituted 3-14 membered heterocyclyl. In certain embodiments, the heterocyclyl group is a substituted 3-14 membered heterocyclyl.

In some embodiments, a heterocyclyl group is a 5-10 membered non-aromatic ring system having ring carbon atoms and 1-4 ring heteroatoms, wherein each heteroatom is independently selected from nitrogen, oxygen, and sulfur ("5-10 membered heterocyclyl"). In some embodiments, a heterocyclyl group is a 5-8 membered non-aromatic ring system having ring carbon atoms and 1-4 ring heteroatoms, wherein each heteroatom is independently selected from nitrogen, oxygen, and sulfur ("5-8 membered heterocyclyl"). In some embodiments, a heterocyclyl group is a 5-6 membered non-aromatic ring system having ring carbon atoms and 1-4 ring heteroatoms, wherein each heteroatom is independently selected from nitrogen, oxygen, and sulfur ("5-6 membered heterocyclyl"). In some embodiments, the 5-6 membered heterocyclyl has 1-3 ring heteroatoms selected from nitrogen, oxygen, and sulfur. In some embodiments, the 5-6 membered heterocyclyl has 1-2 ring heteroatoms selected from nitrogen, oxygen, and sulfur. In some embodiments, the 5-6 membered heterocyclyl has 1 ring heteroatom selected from nitrogen, oxygen, and sulfur.

Exemplary 3-membered heterocyclyl groups containing 1 heteroatom include, without limitation, azirdinyl, oxiranyl, and thiiranyl. Exemplary 4-membered heterocyclyl groups containing 1 heteroatom include, without limitation, azetidinyl, oxetanyl, and thietanyl. Exemplary 5-membered heterocyclyl groups containing 1 heteroatom include, without limitation, tetrahydrofuranyl, dihydrofuranyl, tetrahydrothiophenyl, dihydrothiophenyl, pyrrolidinyl, dihydropyrrolyl, and pyrrolyl-2,5-dione. Exemplary 5-membered heterocyclyl groups containing 2 heteroatoms include, without limitation, dioxolanyl, oxathiolanyl and dithiolanyl. Exemplary 5-membered heterocyclyl groups containing 3 heteroatoms include, without limitation, triazolinyl, oxadiazolinyl, and thiadiazolinyl. Exemplary 6-membered heterocyclyl groups containing 1 heteroatom include, without limitation, piperidinyl, tetrahydropyranyl, dihydropyridinyl, and thianyl. Exemplary 6-membered heterocyclyl groups containing 2 heteroatoms include, without limitation, piperazinyl, morpholinyl, dithianyl, and dioxanyl. Exemplary 6-membered heterocyclyl groups containing 3 heteroatoms include, without limitation, triazinyl. Exemplary 7-membered heterocyclyl groups containing 1 heteroatom include, without limitation, azepanyl, oxepanyl and thiepanyl. Exemplary 8-membered heterocyclyl groups containing 1 heteroatom include, without limitation, azocanyl, oxecanyl and thiocanyl. Exemplary bicyclic heterocyclyl groups include, without limitation, indolinyl, isoindolinyl, dihydrobenzofuranyl, dihydrobenzothienyl, tetrahydrobenzothienyl, tetrahydrobenzofuranyl, tetrahydroindolyl, tetrahydroquinolinyl, tetrahydroisoquinolinyl, decahydroquinolinyl, decahydroisoquinolinyl, octahydrochromenyl, octahydroisochromenyl, decahydronaphthyridinyl, decahydro-1,8-naphthyridinyl, octahydropyrrolo[3,2-b]pyrrole, indolinyl, phthalimidyl, naphthalimidyl, chromanyl, chromenyl, 1H-benzo[e][1,4]diazepinyl, 1,4,5,7-tetrahydropyranol[3,4-b]pyrrolyl, 5,6-dihydro-4H-furo[3,2-b]pyrrolyl, 6,7-dihydro-5H-furo[3,2-b]pyranyl, 5,7-dihydro-4H-thieno[2,3-c]pyranyl, 2,3-dihydro-1H-pyrrolo[2,3-b]pyridinyl, 2,3-dihydrofuro[2,3-b]pyridinyl, 4,5,6,7-tetrahydro-1H-pyrrolo[2,3-b]pyridinyl, 4,5,6,7-tetrahydrofuro[3,2-c]pyridinyl, 4,5,6,7-tetrahydrothieno[3,2-b]pyridinyl, 1,2,3,4-tetrahydro-1,6-naphthyridinyl, and the like.

The term "aryl" refers to a radical of a monocyclic or polycyclic (e.g., bicyclic or tricyclic) 4n+2 aromatic ring system (e.g., having 6, 10, or 14 π electrons shared in a cyclic array) having 6-14 ring carbon atoms and zero heteroatoms provided in the aromatic ring system ("$C_{6-14}$ aryl"). In some embodiments, an aryl group has 6 ring carbon atoms ("$C_6$ aryl"; e.g., phenyl). In some embodiments, an aryl group has 10 ring carbon atoms ("$C_{10}$ aryl"; e.g., naphthyl such as 1-naphthyl and 2-naphthyl). In some embodiments, an aryl group has 14 ring carbon atoms ("$C_{1-4}$ aryl"; e.g., anthracyl). "Aryl" also includes ring systems wherein the aryl ring, as defined above, is fused with one or more carbocyclyl or heterocyclyl groups wherein the radical or point of attachment is on the aryl ring, and in such instances, the number of carbon atoms continue to designate the number of carbon atoms in the aryl ring system. Unless otherwise specified, each instance of an aryl group is independently unsubstituted (an "unsubstituted aryl") or substituted (a "substituted aryl") with one or more substituents. In certain embodiments, the aryl group is an unsubstituted $C_{6-14}$ aryl. In certain embodiments, the aryl group is a substituted $C_{6-14}$ aryl.

The term "heteroaryl" refers to a radical of a 5-14 membered monocyclic or polycyclic (e.g., bicyclic, tricyclic) 4n+2 aromatic ring system (e.g., having 6, 10, or 14 π electrons shared in a cyclic array) having ring carbon atoms and 1-4 ring heteroatoms provided in the aromatic ring system, wherein each heteroatom is independently selected from nitrogen, oxygen, and sulfur ("5-14 membered heteroaryl"). In heteroaryl groups that contain one or more nitrogen atoms, the point of attachment can be a carbon or nitrogen atom, as valency permits. Heteroaryl polycyclic ring systems can include one or more heteroatoms in one or both rings. "Heteroaryl" includes ring systems wherein the heteroaryl ring, as defined above, is fused with one or more carbocyclyl or heterocyclyl groups wherein the point of attachment is on the heteroaryl ring, and in such instances, the number of ring members continue to designate the number of ring members in the heteroaryl ring system. "Heteroaryl" also includes ring systems wherein the heteroaryl ring, as defined above, is fused with one or more aryl groups wherein the point of attachment is either on the aryl or heteroaryl ring, and in such instances, the number of ring members designates the number of ring members in the fused polycyclic (aryl/heteroaryl) ring system. Polycyclic heteroaryl groups wherein one ring does not contain a heteroatom (e.g., indolyl, quinolinyl, carbazolyl, and the like) the point of attachment can be on either ring, i.e., either the ring bearing a heteroatom (e.g., 2-indolyl) or the ring that does not contain a heteroatom (e.g., 5-indolyl).

A group is optionally substituted unless expressly provided otherwise. The term "optionally substituted" refers to being substituted or unsubstituted. In certain embodiments, alkyl, alkenyl, alkynyl, heteroalkyl, heteroalkenyl, heteroalkynyl, carbocyclyl, heterocyclyl, aryl, and heteroaryl groups are optionally substituted. "Optionally substituted" refers to a group which may be substituted or unsubstituted (e.g., "substituted" or "unsubstituted" alkyl, "substituted" or "unsubstituted" alkenyl, "substituted" or "unsubstituted" alkynyl, "substituted" or "unsubstituted" heteroalkyl, "substituted" or "unsubstituted" heteroalkenyl, "substituted" or "unsubstituted" heteroalkynyl, "substituted" or "unsubstituted" carbocyclyl, "substituted" or "unsubstituted" heterocyclyl, "substituted" or "unsubstituted" aryl or "substituted" or "unsubstituted" heteroaryl group). In general, the term "substituted" means that at least one hydrogen present on a group is replaced with a permissible substituent, e.g., a substituent which upon substitution results in a stable compound, e.g., a compound which does not spontaneously undergo transformation such as by rearrangement, cyclization, elimination, or other reaction. Unless otherwise indicated, a "substituted" group has a substituent at one or more substitutable positions of the group, and when more than one position in any given structure is substituted, the substituent is either the same or different at each position. The term "substituted" is contemplated to include substitution with all permissible substituents of organic compounds, and includes any of the substituents described herein that results in the formation of a stable compound. The present invention contemplates any and all such combinations in order to arrive at a stable compound. For purposes of this invention, heteroatoms such as nitrogen may have hydrogen substituents and/or any suitable substituent as described herein which satisfy the valencies of the heteroatoms and results in the formation of a stable moiety. The invention is not intended to be limited in any manner by the exemplary substituents described herein.

Exemplary carbon atom substituents include, but are not limited to, halogen, —CN, —NO$_2$, —N$_3$, —SO$_2$H, —SO$_2$H, —OH, —OR$^{aa}$, —ON(R$^{bb}$)$_2$, —N(R$^{bb}$)$_2$, —N(R$^{bb}$)$_3$$^+$X$^-$, —N(OR$^{cc}$)R$^{bb}$, —SH, —SR$^{aa}$, —SSR$^{cc}$, —C(=O)R$^{aa}$, —CO$_2$H, —CHO, —C(OR$^{cc}$)$_2$, —CO$_2$R$^{aa}$, —OC(=O)R$^{aa}$, —OCO$_2$R$^{aa}$, —C(=O)N(R$^{bb}$)$_2$, —OC(=O)N(R$^{bb}$)$_2$, —NR$^{bb}$C(=O)R$^{aa}$, —NR$^{bb}$CO$_2$R$^{aa}$, —NR$^{bb}$C(=O)N(R$^{bb}$)$_2$, —C(=NR$^{bb}$)R$^{aa}$, —C(=NR$^{bb}$)OR$^{aa}$, —OC(=NR$^{bb}$)R$^{aa}$, —OC(=NR$^{bb}$)OR$^{aa}$, —C(=NR$^{bb}$)N(R$^{bb}$)$_2$, —OC(=NR$^{bb}$)N(R$^{bb}$)$_2$, —NRC(=NR$^{bb}$)N(R$^{bb}$)$_2$, —C(=O)NR$^{bb}$SO$_2$R$^{aa}$, —NR$^{bb}$SO$_2$R$^{aa}$, —SO$_2$N(R$^{bb}$)$_2$, —SO$_2$R$^{aa}$, —SO$_2$OR$^{aa}$, —OSO$_2$R$^{aa}$, —S(=O)R$^{aa}$, —OS(=O)R$^{aa}$, —Si(R$^{aa}$)$_3$, —OSi(R$^{aa}$)$_3$, —C(=S)N(R$^{bb}$)$_2$, —C(=O)SR$^{aa}$, —C(=S)SR$^{aa}$, —SC(=S)SR$^{aa}$, —SC(=O)SR$^{aa}$, —OC(=O)SR$^{aa}$, —SC(=O)OR$^{aa}$, —SC(=O)R$^{bb}$, —P(=O)$_2$R$^{aa}$, —OP(=O)$_2$R$^{aa}$, —P(=O)(R$^{aa}$)$_2$, —OP(=O)(R$^{aa}$)$_2$, —OP(=O)(OR$^{cc}$)$_2$, —P(=O)$_2$N(R$^{bb}$)$_2$, —OP(=O)$_2$N(R$^{bb}$), —P(=O)(NR$^{bb}$)$_2$, —OP(=O)(NR$^{bb}$)$_2$, —NR$^{bb}$P(=O)(OR$^{cc}$)$_2$, —NR$^{bb}$P(=O)(NR$^{bb}$)$_2$, —P(R$^{cc}$)$_2$, —P(R$^{cc}$)$_3$, —OP(R$^{cc}$)$_2$, —OP(R$^{cc}$)$_3$, —B(R$^{aa}$)$_2$, —B(OR$^{cc}$)$_2$, —BR(OR$^{cc}$), C$_{1-10}$ alkyl, C$_{1-10}$ perhaloalkyl, C$_{2-10}$ alkenyl, C$_{2-10}$ alkynyl, heteroC$_{1-10}$ alkyl, heteroC$_{2-10}$ alkenyl, heteroC$_{2-10}$ alkynyl, C$_{3-10}$ carbocyclyl, 3-14 membered heterocyclyl, C$_{6-14}$ aryl, and 5-14 membered heteroaryl, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{dd}$ groups;

or two geminal hydrogens on a carbon atom are replaced with the group =O, =S, =NN(R$^{bb}$)$_2$, =NNR$^{bb}$C(=O)R$^{aa}$, =NNR$^{bb}$C(=O)OR$^{aa}$, =NNR$^{bb}$S(=O)$_2$R$^{aa}$, =NR$^{bb}$, or =NOR$^{cc}$;

each instance of R$^{aa}$ is, independently, selected from C$_{1-10}$ alkyl, C$_{1-10}$ perhaloalkyl, C$_{2-10}$ alkenyl, C$_{2-10}$ alkynyl, heteroC$_{1-10}$ alkyl, heteroC$_{2-10}$alkenyl, heteroC$_{2-10}$alkynyl, C$_{3-10}$ carbocyclyl, 3-14 membered heterocyclyl, C$_{6-14}$ aryl, and 5-14 membered heteroaryl, or two R$^{aa}$ groups are joined to form a 3-14 membered heterocyclyl or 5-14 membered heteroaryl ring, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{dd}$ groups:

each instance of R$^{bb}$ is, independently, selected from hydrogen, —OH, —OR$^{aa}$, —N(R$^{cc}$)$_2$, —CN, —C(=O)R$^{aa}$, —C(=O)N(R$^{cc}$)$_2$, —CO$_2$R$^{aa}$, —SO$_2$R$^{aa}$, —C(=NR$^{cc}$)OR$^{aa}$, —C(=NR$^{cc}$)N(R$^{cc}$)$_2$, —SO$_2$N(R$^{cc}$)$_2$, —SO$_2$R$^{cc}$, —SO$_2$OR$^{cc}$, —SOR$^{aa}$, —C(=S)N(R$^{cc}$)$_2$, —C(=O)SR$^{cc}$, —C(=S)SR$^{cc}$, —P(=O)$_2$R$^{aa}$, —P(=O)(R$^{aa}$)$_2$, —P(=O)$_2$N(R$^{cc}$)$_2$, —P(=O)(NR$^{cc}$)$_2$, C$_{1-10}$ alkyl, C$_{1-10}$ perhaloalkyl, C$_{2-10}$ alkenyl, C$_{2-10}$ alkynyl, heteroC$_{1-10}$alkyl, heteroC$_{2-10}$alkenyl, heteroC$_{2-10}$alkynyl, C$_{3-10}$ carbocyclyl, 3-14 membered heterocyclyl, C$_{6-14}$ aryl, and 5-14 membered heteroaryl, or two R$^{bb}$ groups are joined to form a 3-14 membered heterocyclyl or 5-14 membered heteroaryl ring, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{dd}$ groups;

each instance of R$^{cc}$ is, independently, selected from hydrogen, C$_{1-10}$ alkyl, C$_{1-10}$ perhaloalkyl, C$_{2-10}$ alkenyl, C$_{2-10}$ alkynyl, heteroC$_{1-10}$ alkyl, heteroC$_{2-10}$ alkenyl, heteroC$_{2-10}$ alkynyl, C$_{3-10}$ carbocyclyl, 3-14 membered heterocyclyl, C$_{6-14}$ aryl, and 5-14 membered heteroaryl, or two R$^{cc}$ groups are joined to form a 3-14 membered heterocyclyl or 5-14 membered heteroaryl ring, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{dd}$ groups;

each instance of R$^{dd}$ is, independently, selected from halogen, —CN, —NO$_2$, —N$_3$, —SO$_2$H, —SO$_3$H, —OH, —OR$^{ee}$, —ON(R$^{ff}$)$_2$, —N(R$^{ff}$)$_2$, —N(R$^{ff}$)$_3$$^+$X$^-$, —N(OR$^{ee}$)R$^{ff}$, —SH, —SR$^{ee}$, —SSR$^{ee}$, —C(=O)R$^{ee}$, —CO$_2$H, —CO$_2$R$^{ee}$, —OC(=O)R$^{ee}$, —OCO$_2$R$^{ee}$, —C(=O)N(R$^{ff}$)$_2$, —OC(=O)N(R$^{ff}$)$_2$, —NR$^{ff}$C(=O)R$^{ee}$, —NR$^{ff}$CO$_2$R$^{ee}$, —NR$^{ff}$C(=O)N(R$^{ff}$)$_2$, —C(=NR$^{ff}$)ORC$^{ee}$, —OC(=NR$^{ff}$)R$^{ee}$, —OC(=NR$^{ff}$)OR$^{ee}$, —C(=NR$^{ff}$)N(R$^{ff}$)$_2$, —OC(=NR$^{ff}$)N(R$^{ff}$)$_2$, —NR$^{ff}$C(=NR$^{ff}$)N(R$^{ff}$)$_2$, —NR$^{ff}$SO$_2$R$^{ee}$, —SO$_2$N(R$^{ff}$)$_2$, —SO$_2$R$^{ee}$, —SO$_2$OR$^{ee}$, —OSO$_2$R$^{ee}$, —S(=O)R$^{ee}$, —Si(R$^{ee}$)$_3$, —OSi(R$^{ee}$)$_3$, —C(=S)N(R$^{ff}$)$_2$, —C(=O)SR$^{ee}$, —C(=S)SR$^{ee}$, —SC(=S)SR$^{ee}$, —P(=O)$_2$R$^{ee}$, —P(=O)(R$^{ee}$)$_2$, —OP(=O)(R$^{ee}$)$_2$, —OP(=O)(OR$^{ee}$)$_2$, C$_{1-6}$ alkyl, C$_{1-6}$ perhaloalkyl, C$_{2-6}$ alkenyl, C$_{2-6}$ alkynyl, heteroC$_{1-6}$alkyl, heteroC$_{2-6}$alkenyl, heteroC$_{2-6}$alkynyl, C$_{3-10}$ carbocyclyl, 3-10 membered heterocyclyl, C$_{6-10}$ aryl, 5-10 membered heteroaryl, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{gg}$ groups, or two geminal R$^{dd}$ substituents can be joined to form =O or =S:

each instance of R$^{ee}$ is, independently, selected from C$_{1-6}$ alkyl, C$_{1-6}$ perhaloalkyl, C$_{2-6}$ alkenyl, C$_{2-6}$ alkynyl, heteroC$_{1-6}$ alkyl, heteroC$_{2-6}$alkenyl, heteroC$_{2-6}$ alkynyl, C$_{3-10}$ carbocyclyl, C$_{6-10}$ aryl, 3-10 membered heterocyclyl, and 3-10 membered heteroaryl, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{gg}$ groups;

each instance of R$^{ff}$ is, independently, selected from hydrogen, C$_{1-6}$ alkyl, C$_{1-6}$ perhaloalkyl, C$_{2-6}$ alkenyl, C$_{2-6}$ alkynyl, heteroC$_{1-6}$alkyl, heteroC$_{2-6}$alkenyl, heteroC$_{2-6}$alkynyl, C$_{3-10}$ carbocyclyl, 3-10 membered heterocyclyl C$_{6-10}$ aryl and 5-10 membered heteroaryl, or two R$^{ff}$ groups are joined to form a 3-10 membered heterocyclyl or 5-10 membered heteroaryl ring, wherein each alkyl, alkenyl, alkynyl, heteroalkyl, heteroalkenyl, heteroalkynyl, carbocyclyl, heterocyclyl, aryl, and heteroaryl is independently substituted with 0, 1, 2, 3, 4, or 5 R$^{gg}$ groups; and each instance of R$^{gg}$ is, independently, halogen, —CN, —NO$_2$, —N$_3$, —SO$_2$H, —SO$_3$H, —OH, —OC$_{1-6}$ alkyl, —ON(C$_{1-6}$ alkyl)$_2$, —N(C$_{1-6}$ alkyl)$_2$, —N(C$_{1-6}$ alkyl)$_3$$^+$X$^-$, —NH(C$_{1-6}$ alkyl)$_2$$^+$X$^-$, —NH$_2$(C$_{1-6}$ alkyl)$^+$X$^-$, —NH$_3$$^+$X$^-$, —N(OC$_{1-6}$ alkyl)(C$_{1-6}$ alkyl), —N(OH)(C$_{1-6}$ alkyl), —NH(OH), —SH, —SC$_{1-6}$ alkyl, —SS(C$_{1-6}$ alkyl), —C(=O)(C$_{1-6}$ alkyl), —CO$_2$H, —CO$_2$(C$_{1-6}$ alkyl), —OC(=O)(C$_{1-6}$ alkyl), —OCO$_2$(C$_{1-6}$ alkyl), —C(=O)NH$_2$, —C(=O)N(C$_{1-6}$ alkyl)$_2$, —OC(=O)NH(C$_{1-6}$ alkyl), —NHC(=O)(C$_{1-6}$ alkyl), —N(C$_{1-6}$ alkyl)C(=O)(C$_{1-6}$ alkyl), —NHCO$_2$(C$_{1-6}$ alkyl), —NHC(=O)N(C$_{1-6}$ alkyl)$_2$, —NHC(=O)NH (C$_{1-6}$ alkyl), —NHC(=O)NH$_2$, —C(=NH)O(C$_{1-6}$ alkyl), —OC(=NH)(C$_{1-6}$ alkyl), —OC(=NH)OC$_{1-6}$ alkyl, —C(=NH)N(C$_{1-6}$ alkyl)$_2$, —C(=NH)NH(C$_{1-6}$ alkyl), —C(=NH)NH$_2$, —OC(=NH)N(C$_{1-6}$ alkyl)$_2$, —OC(=NH)NH(C$_{1-6}$ alkyl), —OC(NH)NH$_2$, —NHC(NH)N(C$_{1-6}$ alkyl), —NHC(=NH)NH$_2$, —NHSO$_2$(C$_{1-6}$ alkyl), —SO$_2$N(C$_{1-6}$ alkyl)$_2$, —SO$_2$NH(C$_1$ alkyl). —SO$_2$NH$_2$, —SO$_2$C$_{1-4}$ alkyl, —SO$_2$OC$_{1-6}$ alkyl, —OSO$_2$C$_{1-6}$ alkyl, —SOC$_{1-6}$ alkyl, —Si(C$_{1-6}$ alkyl)$_3$, —OSi(C$_{1-6}$ alkyl)$_3$ —C(=S)N(C$_{1-6}$ alkyl)$_2$, C(=S)NH(C$_{1-6}$ alkyl), C(=S)NH$_2$, —C(=O)S(C$_{1-6}$ alkyl), —C(=S)SC$_{1-6}$ alkyl, —SC(=S)SC$_{1-6}$ alkyl, —P(=O)$_2$(C$_{1-6}$ alkyl), —P(=O)(C$_{1-6}$ alkyl)$_2$, —OP(=O)(C$_{1-6}$ alkyl)$_2$, —OP(=O)(OC$_{1-6}$ alkyl)$_2$, C$_{1-6}$ alkyl, C$_{1-6}$ perhaloalkyl, C$_{2-6}$ alkenyl, C$_{2-6}$ alkynyl, heteroC$_{1-6}$alkyl, heteroC$_{2-6}$alkenyl, heteroC$_{2-6}$alkynyl, C$_{3-10}$ carbocyclyl, C$_{6-10}$ aryl, 3-10 membered heterocyclyl, 5-10 membered heteroaryl; or two geminal R$^{gg}$ substituents can be joined to form =O or =S; wherein X$^-$ is a counterion.

In certain embodiments, the carbon atom substituents are independently halogen, substituted or unsubstituted C$_{1-6}$ alkyl, —OR$^{aa}$, —SR$^{aa}$, —N(R$^{bb}$)$_2$, —CN, —SCN, —NO$_2$, —C(=O)R$^{aa}$, —CO$_2$R$^{aa}$, —C(=O)N(R$^{bb}$)$_2$, —OC(=O)R$^{aa}$, —OCO$_2$R$^{aa}$, —OC(=O)N(R$^{bb}$)$_2$, —NR$^{bb}$C(=O)R$^{aa}$, —NR$^{bb}$CO$_2$R$^{aa}$, or —NR$^{bb}$C(=O)N(R$^{bb}$)$_2$. In certain embodiments, the carbon atom substituents are independently halogen, substituted or unsubstituted C$_{1-6}$ alkyl, —OR$^{aa}$, —SR$^{aa}$, —N(R$^{bb}$)$_2$, —CN, —SCN, or —NO$_2$.

The term "halo" or "halogen" refers to fluorine (fluoro, —F), chlorine (chloro, —Cl), bromine (bromo, —Br), or iodine (iodo, —I).

The term "hydroxyl" or "hydroxy" refers to the group —OH. The term "substituted hydroxyl" or "substituted hydroxyl," by extension, refers to a hydroxyl group wherein the oxygen atom directly attached to the parent molecule is substituted with a group other than hydrogen, and includes groups selected from —OR$^{aa}$, —ON(R$^{bb}$)$_2$, —OC(=O)SR$^{aa}$, —OC(=O)R$^{aa}$, —OCO$_2$R$^{aa}$, —OC(=O)N(R$^{bb}$)$_2$, —OC(=NR$^{bb}$)R$^{aa}$, —OC(=NR$^{bb}$)OR$^{aa}$, —OC(=NR$^{bb}$)N(R$^{bb}$)$_2$, —OS(=O)R$^{aa}$, —OSO$_2$R$^{aa}$, —OSi(R$^{aa}$)$_3$, —OP(R$^{cc}$)$_2$, —OP(R$^{cc}$)$_2^+$X$^-$, —OP(OR$^{cc}$)$_2$, OP(OR$^{cc}$)$_3^+$X$^-$, —OP(=O)(R$^{aa}$)$_2$, —OP(=O)(OR$^{cc}$)$_2$, and —OP(=O)(N(R$^{bb}$))$_2$, wherein X$^-$, R$^{aa}$, R$^{bb}$, and R$^{cc}$ are as defined herein.

The term "amino" refers to the group —NH$_2$. The term "substituted amino," by extension, refers to a monosubstituted amino, a disubstituted amino, or a trisubstituted amino. In certain embodiments, the "substituted amino" is a monosubstituted amino or a disubstituted amino group.

The term "thiol" or "thio" refers to the group —SH. The term "substituted thiol" or "substituted thio," by extension, refers to a thiol group wherein the sulfur atom directly attached to the parent molecule is substituted with a group other than hydrogen, and includes groups selected from —SR$^{aa}$, —S=SR$^{cc}$, —SC(=S)SR$^{aa}$, —SC(=O)SR$^{aa}$, —SC(=O)OR$^{aa}$, and —SC(=O)R$^{aa}$, wherein R$^{aa}$ and R$^{cc}$ are as defined herein.

The term "acyl" refers to a group having the general formula —C(=O)R$^{X1}$, —C(=O)OR$^{X1}$, —C(=O)—O—C(=O)R$^{X1}$, —C(=O)SR$^{X1}$, —C(=O)N(R$^{X1}$)$_2$, —C(=S)R$^{X1}$, —C(=S)N(R$^{X1}$)$_2$, and —C(=S)S(R$^{X1}$), —C(=NR$^{X1}$)R$^{X1}$, —C(=NR$^{X1}$)OR$^{X1}$, —C(=NR$^{X1}$)SR$^{X1}$, and —C(=NR$^{X1}$)N(R$^{X1}$)$_2$, wherein R$^{X1}$ is hydrogen; halogen; substituted or unsubstituted hydroxyl; substituted or unsubstituted thiol; substituted or unsubstituted amino; substituted or unsubstituted acyl, cyclic or acyclic, substituted or unsubstituted, branched or unbranched aliphatic; cyclic or acyclic, substituted or unsubstituted, branched or unbranched heteroaliphatic; cyclic or acyclic, substituted or unsubstituted, branched or unbranched alkyl; cyclic or acyclic, substituted or unsubstituted, branched or unbranched alkenyl; substituted or unsubstituted alkynyl; substituted or unsubstituted aryl, substituted or unsubstituted heteroaryl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, mono- or di-aliphaticamino, mono- or di-heteroaliphaticamino, mono- or di-alkylamino, mono- or di-heteroalkylamino, mono- or di-arylamino, or mono- or di-heteroarylamino; or two R$^{X1}$ groups taken together form a 5- to 6-membered heterocyclic ring. Exemplary acyl groups include aldehydes (—CHO), carboxylic acids (—CO$_2$H), ketones, acyl halides, esters, amides, imines, carbonates, carbamates, and ureas. Acyl substituents include, but are not limited to, any of the substituents described herein, that result in the formation of a stable moiety (e.g., aliphatic, alkyl, alkenyl, alkynyl, heteroaliphatic, heterocyclic, aryl, heteroaryl, acyl, oxo, imino, thiooxo, cyano, isocyano, amino, azido, nitro, hydroxyl, thiol, halo, aliphaticamino, heteroaliphaticamino, alkylamino, heteroalkylamino, arylamino, heteroarylamino, alkylaryl, arylalkyl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, acyloxy, and the like, each of which may or may not be further substituted).

The term "polymer" refers to a molecule including two or more (e.g., 3 or more, 4 or more, 5 or more, 10 or more) repeating units which are covalently bound together. In certain embodiments, a polymer comprises 3 or more, 5 or more, 10 or more, 50 or more, 100 or more, 1000 or more, 2000 or more, or 4000 or more repeating units. In certain embodiments, a polymer comprises more than 4000 repeating units. The repeating units of a polymer are referred to as "monomers." A "homopolymer" is a polymer that consists of a single repeating monomer. A "copolymer" is a polymer that comprises two or more different monomer subunits. Copolymers include, but are not limited to, random, block, alternating, segmented, linear, branched, grafted, and tapered copolymers. Polymers may be natural (e.g., naturally occurring polypeptides), or synthetic (e.g., non-naturally occurring). A polymer may have an overall molecular weight of 50 Da or greater, 100 Da or greater, 500 Da or greater, 1000 Da or greater, 2000 Da or greater, 5000 Da or greater, 10000 Da or greater, 20000 Da or greater, or 50000 Da or greater. Exemplary polymers include, without limitation, polyethylene glycol, poly(D,L-lactide), polyglycolide, poly(ε-caprolactone), polyethylene, and polypropylene glycol.

The terms "number average molecular weight," "number average molar mass," and "$M_n$," are measurements of the molecular mass of a polymer. The number average molecular mass is the ordinary arithmetic mean or average of the molecular masses of the individual polymers. It is determined by measuring the molecular mass of n polymer molecules, summing the masses, and dividing by n. For example, a polymer having 100 repeating units of a monomer with a molecular weight of 100 g/mol would have a number average molecular weight ($M_n$) of 10,000 g/mol [$M_n$=(100)*(100 g/mol)/(1)=10,000 g/mol)]. The number average molecular mass of a polymer can be determined by gel permeation chromatography, viscometry via the Mark-Houwink equation, colligative methods such as vapor pressure osmometry, end-group determination, or $^1$H NMR.

The term "gel" refers to a non-fluid colloidal network or non-fluid polymer network that is expanded throughout its whole volume by a fluid (e.g., a solvent, such as water). A gel has a finite, usually rather small, yield stress. A gel may contain: (i) a covalent molecular network (e.g., polymer network), e.g., a network formed by crosslinking molecules (e.g., polymers) or by nonlinear polymerization; (ii) a molecular network (e.g., polymer network) formed through non-covalent aggregation of molecules (e.g., polymers), caused by complexation (e.g., coordination bond formation), electrostatic interactions, hydrophobic interactions, hydrogen bonding, van der Waals interactions, n-n stacking, or a combination thereof, that results in regions of local order acting as the network junction points. The term "thermoreversible gel" refers to a gel where the regions of local order in the gel are thermally reversible; (iii) a polymer network formed through glassy junction points, e.g., one based on block copolymers. If the junction points are thermally reversible glassy domains, the resulting swollen network may also be termed a thermoreversible gel; (iv) lamellar structures including mesophases, e.g. soap gels, phospholipids, and clays; or (v) particulate disordered structures, e.g., a flocculent precipitate usually consisting of particles with large geometrical anisotropy, such as in $V_2O_5$ gels and globular or fibrillar protein gels. The term "thermoresponsive gel" refers to a gel that exhibits a drastic and discontinuous change of their physical properties with temperature. Typically, the term is commonly used when the physical property concerned is solubility in a given solvent, but it may also be used when other properties are affected. In particular, thermoresponsive gels display a miscibility gap in their temperature-composition diagram. The term "hydrogel" refers to a gel, in which the fluid is water.

The term "small molecule" refers to molecules, whether naturally-occurring or artificially created (e.g., via chemical synthesis) that have a relatively low molecular weight. Typically, a small molecule is an organic compound (i.e., it contains carbon). The small molecule may contain multiple carbon-carbon bonds, stereocenters, and other functional groups (e.g., amines, hydroxyl, carbonyls, and heterocyclic rings, etc.). In certain embodiments, the molecular weight of a small molecule is not more than about 1,000 g/mol, not more than about 900 g/mol, not more than about 800 g/mol, not more than about 700 g/mol, not more than about 600 g/mol, not more than about 500 g/mol, not more than about 400 g/mol, not more than about 300 g/mol, not more than about 200 g/mol, or not more than about 100 g/mol. In certain embodiments, the molecular weight of a small molecule is at least about 100 g/mol, at least about 200 g/mol, at least about 300 g/mol, at least about 400 g/mol, at least about 500 g/mol, at least about 600 g/mol, at least about 700 g/mol, at least about 800 g/mol, or at least about 900 g/mol, or at least about 1,000 g/mol. Combinations of the above ranges (e.g., at least about 200 g/mol and not more than about 500 g/mol) are also possible. In certain embodiments, the small molecule is a therapeutically active agent such as a drug (e.g., a molecule approved by the U.S. Food and Drug Administration as provided in the Code of Federal Regulations (C.F.R.)). The small molecule may also be complexed with one or more metal atoms and/or metal ions. In this instance, the small molecule is also referred to as a "small organometallic molecule." Preferred small molecules are biologically active in that they produce a biological effect in animals, preferably mammals, more preferably humans. Small molecules include, but are not limited to, radionuclides and imaging agents. In certain embodiments, the small molecule is a drug. Preferably, though not necessarily, the drug is one that has already been deemed safe and effective for use in humans or animals by the appropriate governmental agency or regulatory body. For example, drugs approved for human use are listed by the FDA under 21 C.F.R. §§ 330.5, 331 through 361, and 440 through 460, incorporated herein by reference; drugs for veterinary use are listed by the FDA under 21 C.F.R. §§ 500 through 589, incorporated herein by reference. All listed drugs are considered acceptable for use in accordance with the present invention.

The term "monomer" refers to a molecule that may bind covalently to other molecules to form a polymer. The process by which the monomers are combined to form a polymer is called polymerization. Molecules made of a small number of monomer units are called oligomers. Common monomers useful in the methods described herein include, but are not limited to, ethylene oxide, DL-lactide, glycolide, ε-caprolactone, ethylene, and propylene glycol.

The term "photoinitiator" refers to a chemical compound that can produce radical species and/or promote radical reactions when exposed to light irradiation. Common photoinitiators useful in the methods, compositions, kits, and systems described herein include, but are not limited to, benzoin ethers, benzyl ketals, α-dialkoxyacetophenones, α-hydroxyalkylphenones, α-amino alkylphenonones, acylphophine oxides, peroxides, and acylphosphinates, azobisisobutyronitrile, 1,1'-azobis(cyclohexanecarbonitrile), di-tert-butyl peroxide, benzoyl peroxide, methyl ethyl ketone peroxide, and acetone peroxide. An exemplary photoinitiator is lithium phenyl-2,4,6-trimethylbenzoylphosphinate.

The term "solvent" refers to a substance that dissolves one or more solutes, resulting in a solution. A solvent may serve as a medium for any reaction or transformation described herein. The solvent may dissolve one or more reactants or reagents in a reaction mixture. The solvent may facilitate the mixing of one or more reagents or reactants in a reaction mixture. The solvent may also serve to increase or decrease the rate of a reaction relative to the reaction in a different solvent. Solvents can be polar or non-polar, protic or aprotic. Common organic solvents useful in the methods described herein include, but are not limited to, acetone, acetonitrile, benzene, benzonitrile, 1-butanol, 2-butanone, butyl acetate, tert-butyl methyl ether, carbon disulfide carbon tetrachloride, chlorobenzene, 1-chlorobutane. chloroform, cyclohexane, cyclopentane, 1,2-dichlorobenzene, 1,2-dichloroethane, dichloromethane (DCM), N,N-dimethylacetamide N,N-dimethylformamide (DMF), 1,3-dimethyl-3,4,5,6-tetrahydro-2-pyrimidinone (DMPU), 1,4-dioxane, 1,3-dioxane, diethylether, 2-ethoxyethyl ether, ethyl acetate, ethyl alcohol, ethylene glycol, dimethyl ether, heptane, n-hexane, hexanes, hexamethylphosphoramide (HMPA), 2-methoxyethanol, 2-methoxyethyl acetate, methyl alcohol, 2-methylbutane, 4-methyl-2-pentanone, 2-methyl-1-propanol, 2-methyl-2-propanol, 1-methyl-2-pyrrolidinone, dimethylsulfoxide (DMSO), nitromethane, 1-octanol, pentane, 3-pentanone, 1-propanol, 2-propanol, pyridine, tetrachloroethylene, tetrahyrdofuran (THF), 2-methyltetrahydrofuran, toluene, trichlorobenzene, 1,1,2-trichlorotrifluoroethane, 2,2,4-trimethylpentane, trimethylamine, triethylamine, N,N-diisopropylethylamine, diisopropylamine, water, o-xylene, p-xylene.

A "protein," "peptide," or "polypeptide" comprises a polymer of amino acid residues linked together by peptide bonds. The term refers to proteins, polypeptides, and peptides of any size, structure, or function. Typically, a protein will be at least three amino acids long. A protein may refer to an individual protein or a collection of proteins. Inventive proteins preferably contain only natural amino acids, although non-natural amino acids (i.e., compounds that do not occur in nature but that can be incorporated into a polypeptide chain) and/or amino acid analogs as are known in the art may alternatively be employed. Also, one or more of the amino acids in a protein may be modified, for example, by the addition of a chemical entity such as a carbohydrate group, a hydroxyl group, a phosphate group, a farnesyl group, an isofarnesyl group, a fatty acid group, a linker for conjugation or functionalization, or other modification. A protein may also be a single molecule or may be a multi-molecular complex. A protein may be a fragment of a naturally occurring protein or peptide. A protein may be naturally occurring, recombinant, synthetic, or any combination of these.

The term "carbohydrate" or "saccharide" refers to an aldehydic or ketonic derivative of polyhydric alcohols. Carbohydrates include compounds with relatively small molecules (e.g., sugars) as well as macromolecular or polymeric substances (e.g., starch, glycogen, and cellulose polysaccharides). The term "sugar" refers to monosaccharides, disaccharides, or polysaccharides. Monosaccharides are the simplest carbohydrates in that they cannot be hydrolyzed to smaller carbohydrates. Most monosaccharides can be represented by the general formula $C_yH_{2y}O_y$ (e.g., $C_6H_{12}O_6$ (a hexose such as glucose)), wherein y is an integer equal to or greater than 3. Certain polyhydric alcohols not represented by the general formula described above may also be considered monosaccharides. For example, deoxyribose is of the formula $C_5H_{10}O_4$ and is a monosaccharide. Monosaccharides usually consist of five or six carbon atoms and are referred to as pentoses and hexoses, receptively. If the monosaccharide contains an aldehyde it is referred to as an aldose; and if it contains a ketone, it is referred to as a ketose. Monosaccharides may also consist of three, four, or seven carbon atoms in an aldose or ketose form and are referred to as trioses, tetroses, and heptoses, respectively. Glyceraldehyde and dihydroxyacetone are considered to be aldotriose and ketotriose sugars, respectively. Examples of aldotetrose sugars include erythrose and threose; and ketotetrose sugars include erythrulose. Aldopentose sugars include ribose, arabinose, xylose, and lyxose; and ketopentose sugars include ribulose, arabulose, xylulose, and lyxulose. Examples of aldohexose sugars include glucose (for example, dextrose), mannose, galactose, allose, altrose, talose, gulose, and idose; and ketohexose sugars include fructose, psicose, sorbose, and tagatose. Ketoheptose sugars include sedoheptulose. Each carbon atom of a monosaccharide bearing a hydroxyl group (—OH), with the exception of the first and last carbons, is asymmetric, making the carbon atom a stereocenter with two possible configurations (R or S). Because of this asymmetry, a number of isomers may exist for any given monosaccharide formula. The aldohexose D-glucose, for example, has the formula $C_6H_{12}O_6$, of which all but two of its six carbons atoms are stereogenic, making D-glucose one of the 16 (i.e., $2^4$) possible stereoisomers. The assignment of D or L is made according to the orientation of the asymmetric carbon furthest from the carbonyl group: in a standard Fischer projection if the hydroxyl group is on the right the molecule is a D sugar, otherwise it is an L sugar. The aldehyde or ketone group of a straight-chain monosaccharide will react reversibly with a hydroxyl group on a different carbon atom to form a hemiacetal or hemiketal, forming a heterocyclic ring with an oxygen bridge between two carbon atoms. Rings with five and six atoms are called furanose and pyranose forms, respectively, and exist in equilibrium with the straight-chain form. During the conversion from the straight-chain form to the cyclic form, the carbon atom containing the carbonyl oxygen, called the anomeric carbon, becomes a stereogenic center with two possible configurations: the oxygen atom may take a position either above or below the plane of the ring. The resulting possible pair of stereoisomers is called anomers. In an α anomer, the —OH substituent on the anomeric carbon rests on the opposite side (trans) of the ring from the —CH$_2$OH side branch. The alternative form, in which the —CH$_2$OH substituent and the anomeric hydroxyl are on the same side (cis) of the plane of the ring, is called a β anomer. A carbohydrate including two or more joined monosaccharide units is called a disaccharide or polysaccharide (e.g., a trisaccharide), respectively. The two or more monosaccharide units bound together by a covalent bond known as a glycosidic linkage formed via a dehydration reaction, resulting in the loss of a hydrogen atom from one monosaccharide and a hydroxyl group from another. Exemplary disaccharides include sucrose, lactulose, lactose, maltose, isomaltose, trehalose, cellobiose, xylobiose, laminaribiose, gentiobiose, mannobiose, melibiose, nigerose, or rutinose. Exemplary trisaccharides include, but are not limited to, isomaltotriose, nigerotriose, maltotriose, melezitose, maltotriulose, raffinose, and kestose. The term carbohydrate also includes other natural or synthetic stereoisomers of the carbohydrates described herein.

The terms "polynucleotide", "nucleotide sequence", "nucleic acid", "nucleic acid molecule", "nucleic acid sequence", and "oligonucleotide" refer to a series of nucleotide bases (also called "nucleotides") in DNA and RNA, and mean any chain of two or more nucleotides. The polynucleotides can be chimeric mixtures or derivatives or modified versions thereof, single-stranded or double-stranded. The oligonucleotide can be modified at the base moiety, sugar moiety, or phosphate backbone, for example, to improve stability of the molecule, its hybridization parameters, etc. The antisense oligonucleotide may comprise a modified base moiety which is selected from the group including 5-fluorouracil, 5-bromouracil, 5-chlorouracil, 5-iodouracil, hypoxanthine, xanthine, 4-acetylcytosine, 5-(carboxyhydroxylmethyl) uracil, 5-carboxymethylaminomethyl-2-thiouridine, 5-carboxymethylaminomethyluracil, dihydrouracil, beta-D-galactosylqueosine, inosine, N6-isopentenyladenine, 1-methylguanine, 1-methylinosine, 2,2-dimethylguanine, 2-methyladenine, 2-methylguanine, 3-methylcytosine, 5-methylcytosine, N6-adenine, 7-methylguanine, 5-methylaminomethyluracil, 5-methoxyaminomethyl-2-thiouracil, beta-D-mannosylqueosine, 5'-methoxycarboxymethyluracil, 5-methoxyuracil, 2-methylthio-N6-isopentenyladenine, wybutoxosine, pseudouracil, queosine, 2-thiocytosine, 5-methyl-2-thiouracil, 2-thiouracil, 4-thiouracil, 5-methyluracil, uracil-5-oxyacetic acid methylester, uracil-5-oxyacetic acid, 5-methyl-2-thiouracil, 3-(3-amino-3-N-2-carboxypropyl) uracil, a thio-guanine, and 2,6-diaminopurine. A nucleotide sequence typically carries genetic information, including the information used by cellular machinery to make proteins and enzymes. These terms include double- or single-stranded genomic and cDNA, RNA, any synthetic and genetically manipulated polynucleotide, and both sense and antisense polynucleotides. This includes single- and double-stranded molecules. i.e., DNA-DNA, DNA-RNA and RNA-RNA hybrids, as well as "protein nucleic acids" (PNAs) formed by conjugating bases to an amino acid backbone. This also includes nucleic acids containing carbohydrate or lipids. Exemplary DNAs include single-stranded DNA (ssDNA), double-stranded DNA (dsDNA), plasmid DNA (pDNA), genomic DNA (gDNA), complementary DNA (cDNA), antisense DNA, chloroplast DNA (ctDNA or cpDNA), microsatellite DNA, mitochondrial DNA (mtDNA or mDNA), kinetoplast DNA (kDNA), provirus, lysogen, repetitive DNA, satellite DNA, and viral DNA. Exemplary RNAs include single-stranded RNA (ssRNA), double-stranded RNA (dsRNA), small interfering RNA (siRNA), messenger RNA (mRNA), precursor messenger RNA (pre-mRNA), small hairpin RNA or short hairpin RNA (shRNA), microRNA (miRNA), guide RNA (gRNA), transfer RNA (tRNA), antisense RNA (asRNA), heterogeneous nuclear RNA (hnRNA), coding RNA, non-coding RNA (ncRNA), long non-coding RNA (long ncRNA or lncRNA), satellite RNA, viral satellite RNA, signal recognition particle RNA, small cytoplasmic RNA, small nuclear RNA (snRNA), ribosomal RNA (rRNA), Piwi-interacting RNA (piRNA), polyinosinic acid, ribozyme, flexizyme, small nucleolar RNA (snoRNA), spliced leader RNA, viral RNA, and viral satellite RNA.

The terms "plateau modulus", "rubbery plateau", or "$G_p$" refer to the area above the glass transition temperature and the below the melting temperature of a polymer. The appearance of a rubbery plateau is the result of entanglements or crosslinks. Both the width of this region as well as the properties in this region depend on the molecular weight between entanglements ($M_e$) or crosslinks. Only polymers that are sufficiently long can form stable, flow restricting entanglements. The rubbery plateau modulus, $G_p$, is inversely proportional to the molecular weight between the entanglements, $M_e$.

The term "relaxation time" refers to a time constant for a system (i.e., polymer network) to return to equilibrium in response to a disturbance (i.e., pressure change, temperature change, etc.) The progress of the relaxation can be observed electronically by measuring the change in properties, such as electrical conductivity or spectroscopic absorption.

The term "terminal velocity" refers to the highest velocity attainable by an object as it falls through a fluid. It occurs when the sum of the drag force and the buoyancy is equal to the downward force of gravity acting on the object. Since the net force on the object is zero, the object has zero acceleration. In fluid dynamics, the object is moving at its terminal velocity if its speed is contant due to the restraining force exerted by the fluid through which it is moving.

The term "stiffness" refers to the rigidity of an object—the extent to which it resists deformation in response to an applied force. The stiffness, k, of a body is a measure of the resistance offered by an elastic body to deformation. For an elastic body with a single degree of freedom, the stiffness is defined as k=F/d, where F is the force on the body and d is the displacement produced by the force along the same degree of freedom. Rotational stiffness is defined as k=M/θ, where M is the applied moment and θ is the rotation. Axial stiffness is defined as k=AE/L, where A is the cross-sectional area, E is the tensile elastic modulus (or Young's modulus), and L is the length of the element. Rotational stiffness is defined k=GJ/L, where J is the torsion constant for the section, G is the rigidity modulus of the material and L is the length of the element.

The term "toughness" refers to the ability of a material to absorb energy and plastically deform without fracturing. Toughness can be defined as the amount of energy per unit volume that a material can absorb before rupturing. Toughness can also be defined as a material's resistance to fracture when stressed. Toughness can be determined by integrating the stress-strain curve. The mathematical description is:

$$\text{toughness} = \frac{\text{energy}}{\text{volume}} = \int_0^{\epsilon_f} \sigma d\epsilon,$$

where $\epsilon$ is strain, $\epsilon_f$ is the strain upon failure, and $\sigma$ is stress.

The term "viscosity" refers to the measure of a fluid's resistance to gradual deformation by shear stress or tensile stress. Viscosity is a property of a fluid which opposes the relative motion between the two surfaces of the fluid in a fluid that are moving at different velocities.

The term "elasticity" refers to the ability of a body to resist a distorting influence or deforming force and to return to its original size and shape when influence or force is removed. Solid objects will deform when adequate forces are applied on them. If the material is elastic, the object will return to its initial shape and size when these forces are removed.

The term "viscoelasticity" refers to the property of materials that exhibit both viscous and elastic characteristics when undergoing deformation. Viscoelastic materials have elements of both of these properties and, as such, exhibit time-dependent strain.

The terms "dynamic modulus" or "complex modulus" refer to the ratio of stress to strain under vibratory conditions (calculated from data obtained from whether free or forced vibration tests, in shear, compression, or elongation).

The term "storage modulus" refers the measure of stored energy of a viscoelastic material.

The term "loss modulus" refers to the measure of energy dissipated as heat of a viscoelastic material.

The term "energy dissipation" refers to a physical process (as the cooling of a body in open air) by which energy becomes not only unavailable but irrecoverable in any form.

The term "adhesive" may be used interchangeably with "glue", "cement", "mucilage", or "paste", and refers to any substance applied to one surface, or both surfaces, or two separate items that binds them together and resists their separation.

The term "biomaterial" refers to any substance that has been engineered to interact with biological systems for a medical purpose—either a therapeutic (treat, augment, repair or replace a tissue function of the body) or a diagnostic one. Biomaterials can be derived either from nature or synthesized in the laboratory using a variety of chemical approaches utilizing metallic components, polymers, ceramics, or composite materials. They are often used and/or adapted for a medical application, and thus comprises whole or part of a living structure or biomedical device which performs, augments, or replaces a natural function.

The term "self-healing" describes an artificial or synthetically-created substances that have the built-in ability to automatically repair damage to themselves without any external diagnosis of the problem or human intervention. Self-healing materials counter degradation through the initiation of a repair mechanism that responds to damage. Healing mechanisms vary from an intrinsic repair of the material to the addition of a repair agent contained in a microscopic vessel. Self-healing polymers may activate in response to a external stimulus (i.e., light, temperature change, etc.) to initiate the healing process.

The term "coating" refers to a covering that is applied to the surface of an object. The purpose of applying the coating may be decorative, functional, or both. Functional coatings may be applied to change the surface properties of the object, such as adhesion, wettability, corrosion resistance, or wear resistance.

BRIEF DESCRIPTION OF THE DRAWINGS

The accompanying drawings, which constitute a part of this specification, illustrate several embodiments of the invention and together with the description, serve to explain the principles of the invention.

FIG. 9A shows UV-vis absorption of a 2.5 wt % solution of LAP shows the strong absorbance band at ca. 350-400 nm, and FIG. 9B shows that its characteristic absorbance is linearly proportional to its concentration. In FIG. 9C, the functionality of LAP was confirmed by using it to photopolymerize a 10 wt %, 10 kDa four-arm PEG-acrylate hydrogel (structure above figure). The gel point occurs within ~2-3 minutes after initiating UV irradiation, and full cure of the gel on the apparatus occurs in approximately 5-10 minutes as measured by G'(1 rad/s).

DETAILED DESCRIPTION OF CERTAIN EMBODIMENTS

Figure 1:
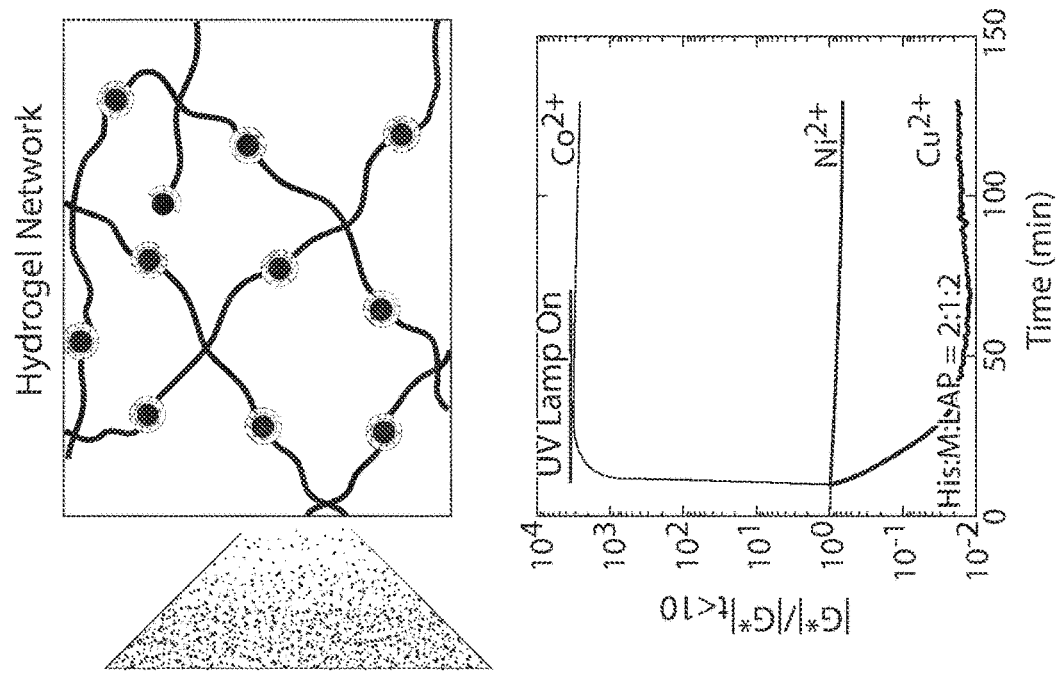
FIG. 1 shows the four-arm polyethylene glycol of which the hydrogels are composed, where the end of each arm is functionalized with an N-terminal histidine residue (4PEG-His). The histidines form complexes with transition metal ions $M^{2+}$ (M=Ni, Cu, Co), which crosslink the 4PEG-His polymers resulting in a viscoelastic hydrogel. A water-soluble radical photo-initiator, lithium phenyl-2,4,6-trimethylbenzoylphosphinate (LAP), was used to create hydrogels with viscoelastic properties that are responsive to longwave (~365 nm) irradiation. The radicals generated by the photo-dissociation of LAP react with the His:$M^{2+}$ crosslinks in different ways depending on the metal ion, resulting in a variety of viscoelastic properties which can be triggered by low-intensity UV irradiation, as shown in the bottom figure: $Cu^{2+}$-based hydrogels lose all rigidity, while $Co^{2+}$-based hydrogels become several orders of magnitude stiffer. In contrast, $Ni^{2+}$-based hydrogels are not strongly affected by UV-generated radicals.
Figure 1:
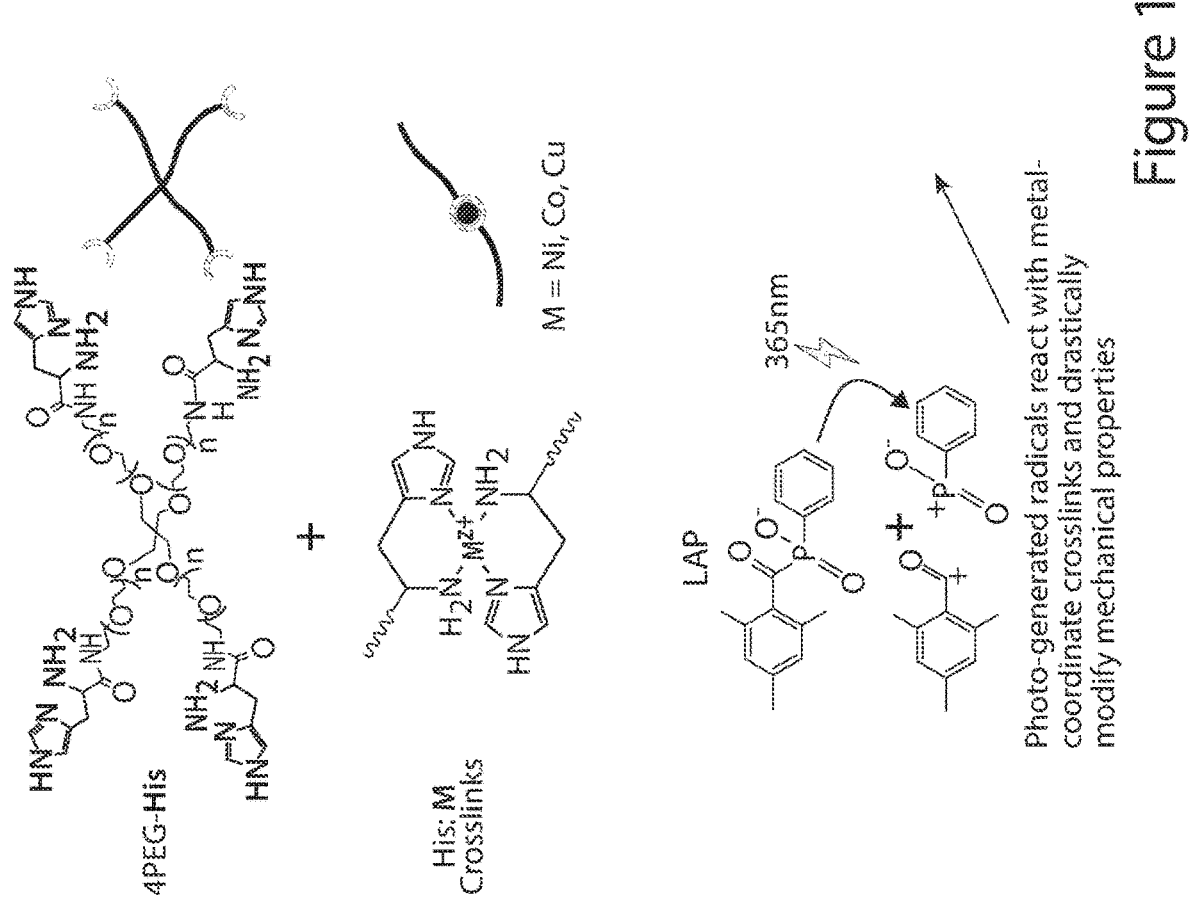

Before the disclosed systems, compositions, methods, reagents, and kits are described in more detail, it is to be understood that the aspects described herein are not limited to specific embodiments, methods, apparati, or configurations, and as such can, of course, vary. It is also to be understood that the terminology used herein is for the purpose of describing particular aspects only and, unless specifically defined herein, is not intended to be limiting.

Provided herein are polymer networks capable of undergoing changes to static and dynamic properties due to oxidation and/or reduction reactions. In certain embodiments, the present disclosure describes methods of switching between material properties of polymer networks of the general form: polymer-ligand:metal, by exposure to light. Also included within the present disclosure are descriptions for the uses of these polymer networks (e.g., hydrogels), kits comprising these polymer networks, and materials and reagents to synthesize, prepare, modify, and manipulate these polymer networks.

In one embodiment, the present disclosure describes methods for altering the properties of a polymer network comprising exposing the polymer network to light in the presence of a photoinitiator; wherein the polymer network is comprised of polymers non-covalently crosslinked by coordination of the polymers to metals; and wherein the metals undergo oxidation and/or reduction reactions upon exposure to light in the presence of the photoinitiator. In certain embodiment, the resulting polymer network forms a hydrogel. In some embodiments, the metal ions form complexes with ligand moieties, which act as transient crosslinks to control the properties of a polymer network, and different metal ion complexes respond in dramatically different fashions when exposed to light-generated radicals from the photoinitator. By selecting the metal ion mixtures which form the transient crosslinks, it is possible to create materials with specific energy-dissipation properties and therefore "designer" viscoelastic material functions. With the understanding of how each metal ion complex responds to radicals generated from photo-dissociation of a photoinitiator, the energy-dissipation modes can be programmed to adopt a new set of strengths and characteristic timescales, creating materials with viscoelastic material functions that are programmable with light irradiation. These types of strategies could be applied to the design of soft adhesives or in the creation of biomaterials optimized for specific dynamic loading contexts.

Components of Polymer Network
Polymers

One aspect of the present disclosure relates to polymers. In certain embodiments, the polymers are multi-arm polymers. In certain embodiments, the end of each polymer arm is covalently bound to a ligand moiety. In certain embodiments, the arms of the multi-arm polymers are attached to a central atom, an optionally substituted alkyl group, an optionally substituted heteroalkyl group, optionally substituted alkoxy group, or a combination thereof.

In certain embodiments, the polymers are of formula:

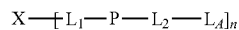

wherein: X is carbon, silicon, nitrogen, oxygen, sulfur, optionally substituted alkyl, optionally substituted heteroalkyl, optionally substituted carbocyclyl, optionally substituted heterocyclyl, optionally substituted aryl, optionally substituted heteroaryl, optionally substituted alkoxy, or a combination thereof, each $L_1$ and $L_2$ are independently substituted or unsubstituted, cyclic or acyclic, branched or unbranched aliphatic; substituted or unsubstituted, cyclic or acyclic, branched or unbranched heteroaliphatic; substituted or unsubstituted aryl; or substituted or unsubstituted heteroaryl, or a combination thereof, each P is independently a linear or branched, homopolymer or copolymer, or a combination thereof, having a number average molecular weight of about 10) Da to 60000 Da; each $L_A$ is independently a ligand moiety that coordinates to a metal (For an example of a histidine moiety coordinating to a metal, see FIG. 1); and n is an integer between 2 and 4, inclusive.

In certain embodiments, the polymers are multi-arm polymers consisting of covalently bound ligand moieties at the end of each polymer arm. In certain embodiments, the polymers are selected from a group consisting of one-arm polymers, two-arm polymers, three-arm polymers, four-arm polymers, five-arm polymers, six-arm polymers, seven-arm polymers, and eight-arm polymers. In certain embodiments, X is carbon and the polymers are four-arm polymers. In certain embodiments, X is silicon and the polymers are four-arm polymers. In certain embodiments, X is nitrogen and the polymers are three-arm polymers. In certain, embodiments, X is oxygen and the polymers are two-arm polymers. In certain, embodiments, X is sulfur and the polymers are two-arm polymers.

In certain embodiment, each arm of the polymer comprises repeating units covalently bound together. In certain embodiments, the repeating units are monomers selected from the group consisting of ethylene oxide, DL-lactide, glycolide, ε-caprolactone, ethylene, and propylene glycol. In certain embodiments, each arm of the polymer comprises 1 to 100 repeating units, inclusive. In certain embodiments, each arm of the polymer comprises 2 to 100 repeating units, inclusive. In certain embodiments, each arm of the polymer comprises 2 to 75 repeating units, inclusive. In certain embodiments, each arm of the polymer comprises 2 to 50 repeating units, inclusive. In certain embodiments, each arm of the polymer comprises 2 to 25 repeating units, inclusive. The polymers of the polymer arms may be of any molecular weight. In certain embodiments, the polymers of the polymer arms each independently have a number average molecular weight ranging from about 100 to about 60000 Da, about 500 to about 60000 Da, about 1000 to about 60000 Da, about 2000 to about 60000 Da, about 5000 to about 60000 Da, about 10000 to about 60000 Da, about 20000 to about 60000 Da, about 10000 to about 50000 Da, about 20000 to about 50000 Da, about 30000 to about 50000 Da, or about 30000 to about 60000 Da; each range being inclusive.

In certain embodiment, each arm of the polymer comprises a polymer selected from the group consisting of linear homopolymer, branched homopolymer, random copolymer, block copolymer, alternating copolymer, segmented copolymer, linear copolymer, branched copolymer, grafted copolymer, and tapered copolymers. In certain embodiment, each polymer arm contains a polymer selected from the group consisting of polyethylene glycol, poly(D,L-lactide), polyglycolide, poly(ε-caprolactone), polyethylene, and polyethylene glycol (PEG).

In certain embodiments, the ligand moiety covalently bound to the end of the polymer arms are selected from the group consisting of proteins, polysaccharides, nucleic acids, amino acids, organic diacids, polypeptides, amines, thiols, ethers, alcohols, polyacids, polyamines, heterocycles, and heteroaryls. In certain embodiments, the end of each arm of the polymer is covalently bound to the same ligand moiety. In certain embodiments, the end of each arm of the polymer is covalently bound to the different ligand moieties. In certain embodiments, the ligand moiety is terpyridine. In certain embodiments, the ligand moiety is catechol. In certain embodiments, the ligand moiety is histidine.

In certain embodiments, the polymers are multi-arm polymers, wherein each arm of the polymer comprises polyethylene glycol (PEG). In certain embodiments, the polymers are multi-arm polymers, wherein each arm of the polymer comprises polyethylene glycol (PEG) substituted with a histidine moiety. In certain embodiments, the polymers are four-arm polymers, wherein each arm of the polymer comprises polyethylene glycol (PEG) substituted with a histidine moiety. In one embodiment, each arm of the polymer comprises a histidine moiety. In certain embodiment, the polymer is of the formula:

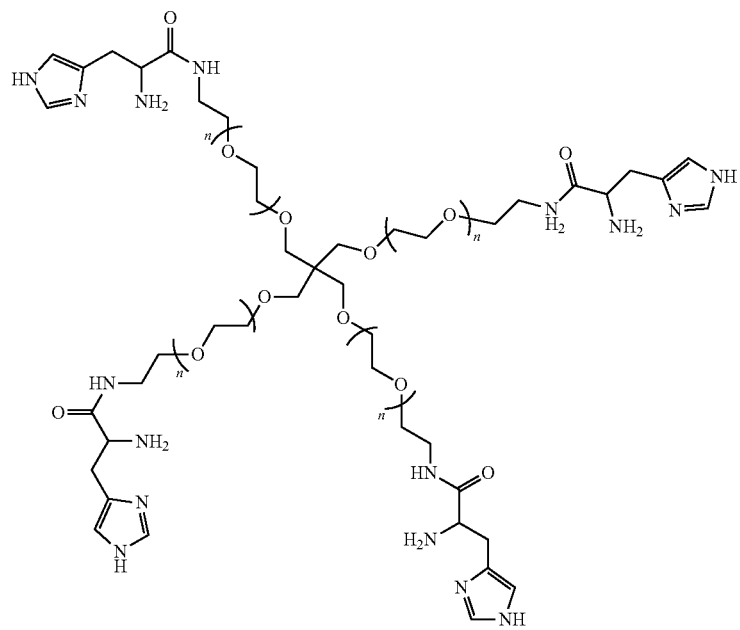

wherein n is between 1 and 100, inclusive.

Metals

In certain embodiments, one or more metals are selected from the group consisting of scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, rutherfordium, dubnium, seaborgium, bohrium, hassium, and meitnerium. In certain embodiments, the metal is one metal. In certain embodiments, the metal is cobalt. In certain embodiments, the metal is nickel. In certain embodiments, the metal is copper. In certain embodiments, the metal is zinc. In certain embodiments, the metal is a combination of two to five different metals, inclusive. In certain embodiments, the metal is a combination of two to four different metals, inclusive. In certain embodiments, the metal is a combination of two to three different metals, inclusive. In certain embodiments, the metal is a combination of five metals. In certain embodiments, the metal is a combination of four metals. In certain embodiments, the metal is a combination of three metals. In certain embodiments, the metal is a combination of two metals. In certain embodiment, the metal is a combination of nickel and copper. In certain embodiment, the metal is a combination of nickel and cobalt. In certain embodiment, the metal is a combination of cobalt and copper. The molar ratio of the metal ions of the double-metal polymer networks can range between 1:99 to 99:1. In certain embodiments, the molar ratio of the metal ions of the double-metal polymer networks can range between 1:99 and 10:90, 10:90 and 20:80, 20:80 and 30:70, 30:70 and 40:60, 40:60 and 50:50, 50:50 and 60:40, 60:40 and 70:30, 70:30 and 80:20, 80:20 and 90:10, or 90:10 and 99:1.

The oxidation number of the metal can range from 0 to 8, inclusive. In certain embodiment, the oxidation number of the metal is 1. In certain embodiment, the oxidation number of the metal is 2. In certain embodiment, the oxidation number of the metal is 3. In certain embodiment, the oxidation number of the metal is 4. In certain embodiment, the oxidation number of the metal is 5. In certain embodiment, the oxidation number of the metal is 6. In certain embodiment, the oxidation number of the metal is 7. In certain embodiment, the oxidation number of the metal is 8. In certain embodiments, the oxidation number of nickel is between 0 and 4, inclusive. In certain embodiments, the oxidation number of nickel is 2. In certain embodiments, the oxidation number of cobalt is between 0 and 5, inclusive. In certain embodiments, the oxidation number of cobalt is 2. In certain embodiments, the oxidation number of cobalt is 3. In certain embodiments, the oxidation number of copper is between 0 and 4, inclusive. In certain embodiments, the oxidation number of copper is 2. In certain embodiments, the oxidation number of copper is 1. In certain embodiments, the oxidation number of nickel is the same throughout the polymer network. In certain embodiments, the oxidation number of nickel differs within the polymer network. In certain embodiments, the oxidation number of cobalt is the same throughout the polymer network. In certain embodiments, the oxidation number of cobalt differs within the polymer network. In certain embodiments, the oxidation number of copper is the same throughout the polymer network. In certain embodiments, the oxidation number of copper differs within the polymer network.

Methods for Preparing and Altering Properties of Polymer Networks

In certain embodiments, the present disclosure provides methods for altering the properties of a polymer network (e.g., metal-crosslinked hydrogels) comprising exposing the polymer network to light in the presence of a photoinitiator; wherein the polymer network is comprised of polymers non-covalently crosslinked by coordination of the polymers to metals (e.g., copper, nickel, cobalt); and wherein the metals undergo oxidation and/or reduction upon exposure to light in the presence of the photoinitiator.

In certain embodiments, the polymer network was formed by mixing in order: (1) a solution of polymer in solvent, (2) a buffer solution, (3) solvent, (4) a solution of photoinitiator, and (5) and a solution of metal salts. Upon adding the solution of metal salts, gelation (polymer network formation) was observed nearly instantaneously at the site of injection. Samples were thoroughly homogenized by vortex mixing, centrifuged to remove air bubbles, and stored at room temperature in the dark. This protocol allows for the formation of the polymer network in the presence of the photoinitiator, but avoids uncontrolled photo-dissociation of the photoinitiator. In certain embodiment, the solution of polymer in solvent is 200 mg/mL solution of 4PEG-His in MilliQ $H_2O$. In certain embodiment, the buffer solution is 1.0 M solution of 3-(N-morpholino)propanesulfonic acid (MOPS) buffer at pH 7.4. In certain embodiment, the solvent is MilliQ $H_2O$. In certain embodiment, the solution of photoinitiator an aqueous solution of LAP. In certain embodiments, the solution of metal salts is an aqueous solution of $NiCl_2.6H_2O$, $CuCl_2.2H_2O$, or $CoCl_2.6H_2O$. In certain embodiments, the solution of metal salts consists of one type of metal ion. In certain embodiments, the solution of metal salts consists of two types of metal ions. In certain embodiments, the solution of metal salts consists of more than two types of metal ions. In certain embodiments, the final buffer concentration was 0.2 M in polymer network. In certain embodiment, the samples were centrifuged for 5 minutes.

In certain embodiments, polymer networks containing a photoinitiator is irradiated with light. In certain embodiment, the light irradiation causes photo-dissociation of the photoinitiator to generate free radicals. In certain embodiment, the free radicals can effect oxidation and/or reduction of the metals. In certain embodiment, the oxidation and/or reduction of the metals alters properties of the resulting polymer network.

In certain embodiments, a polymer network prepared by a process comprising the steps of: providing a substrate polymer network comprised of polymers non-covalently crosslinked by coordination of the polymers to metals; contacting the polymer network with a photoinitiator to form a mixture; irradiating the mixture with light; whereby the irradiation results in a change in the oxidation state of the metal. In certain embodiments, the mixture further comprises a solvent. Solvents can be polar or non-polar, protic or aprotic. Common organic solvents useful in the methods described herein include acetone, acetonitrile, benzene, benzonitrile, 1-butanol, 2-butanone, butyl acetate, tert-butyl methyl ether, carbon disulfide carbon tetrachloride, chlorobenzene, 1-chlorobutane, chloroform, cyclohexane, cyclopentane, 1,2-dichlorobenzene, 1,2-dichloroethane, dichloromethane (DCM), N,N-dimethylacetamide N,N-dimethylformamide (DMF), 1,3-dimethyl-3,4,5,6-tetrahydro-2-pyrimidinone (DMPU), 1,4-dioxane, 1,3-dioxane, diethylether, 2-ethoxyethyl ether, ethyl acetate, ethyl alcohol, ethylene glycol, dimethyl ether, heptane, n-hexane, hexanes, hexamethylphosphoramide (HMPA), 2-methoxyethanol, 2-methoxyethyl acetate, methyl alcohol, 2-methylbutane, 4-methyl-2-pentanone, 2-methyl-1-propanol, 2-methyl-2-propanol, 1-methyl-2-pyrrolidinone, dimethylsulfoxide (DMSO), nitromethane, 1-octanol, pentane, 3-pentanone, 1-propanol, 2-propanol, pyridine, tetrachloroethylene, tetrahyrdofuran (THF), 2-methyltetrahydrofuran, toluene, trichlorobenzene, 1,1,2-trichlorotrifluoroethane, 2,2,4-trimethylpentane, trimethylamine, triethylamine, N,N-diisopropylethylamine, diisopropylamine, water, o-xylene, p-xylene. In certain embodiments, the solvent is water. In certain embodiments, the mixture does not include a solvent.

In certain embodiments, the photoinitiator is selected from a group consisting of benzoin ethers, benzyl ketals, α-dialkoxyacetophenones, α-hydroxyalkylphenones, α-amino alkylphenonones, acylphophine oxides, peroxides, acylphosphinates, azobisisobutyronitrile, 1,1'-azobis(cyclohexanecarbonitrile), di-tert-butyl peroxide, benzoyl peroxide, methyl ethyl ketone peroxide, and acetone peroxide. In certain embodiments, the photoinitiator is an acylphosphinate. In certain embodiment, the photoinitiator is lithium phenyl-2,4,6-trimethylbenzoylphosphinate (LAP). In certain embodiments, the photoinitiator is is soluble in one or more solvents. In certain embodiments, the photoinitiator is soluble in one or more organic solvents and one or more non-organic solvents. In certain embodiments, the photoinitiator is soluble in one or more organic solvents. In certain embodiments, the photoinitiator is soluble in one or more non-organic solvents. In certain embodiment, the photoinitiator is soluble in water.

In certain embodiments, the photoinitiator undergoes photo-dissociation to generate free radicals upon exposure to light irradiation. In certain embodiments, the photo-dissociation of lithium phenyl-2,4,6-trimethylbenzoylphosphinate (LAP) generates free radicals upon UV irradiation. The free radicals are capable of effecting oxidation and/or reduction of metals within the polymer network. In certain embodiments, the free radicals effect multi-electron reduction and/or multi-electron oxidation of metals within the polymer network. In certain embodiments, the free radicals effect single-electron reduction and/or single-electron oxidation of metals within the polymer network. In certain embodiments, the percentage of metal ions of any type that undergo reduction by the free radicals is in the range between 0% to 10%, 10% to 20%, 20% to 30%, 30% to 40%, 40% to 50%, 50% to 60%, 60% to 70%, 70% to 80%, 80% to 90%, or 90% to 100%. In certain embodiments, the percentage of metal ions of any type that undergo oxidation by the free radicals is in the range between 0% to 10%, 10% to 20%, 20% to 30%, 30% to 40%, 40% to 50%, 50% to 60%, 60% to 70%, 70% to 80%, 80% to 90%, or 90% to 100%.

The wavelength of light irradiation to the photoinitiator corresponds to at least enough energy to effect photo-dissociation of the photoinitiator. In the present disclosure, the wavelength of light irradiation to the photoinitiator can range from 10 nm to 1000 nm. In certain embodiments, the wavelength of light irradiation is between approximately 10 nm and approximately 100 nm, inclusive. In certain embodiments, the wavelength of light irradiation is between approximately 100 nm and approximately 200 nm, inclusive. In certain embodiments, the wavelength of light irradiation is between approximately 200 nm and approximately 300 nm, inclusive. In certain embodiments, the wavelength of light irradiation is between approximately 300 nm and approximately 400 nm, inclusive. In certain embodiments, the wavelength of light irradiation is between approximately 400 nm and approximately 500 nm, inclusive. In certain embodiments, the wavelength of light irradiation is between approximately 500 nm and approximately 600 nm, inclusive. In certain embodiments, the wavelength of light irradiation is between approximately 600 nm and approximately 700 nm, inclusive. In certain embodiments, the wavelength of light irradiation is between approximately 700 nm and approximately 800 nm, inclusive. In certain embodiments, the wavelength of light irradiation is between approximately 800 nm and approximately 900 nm, inclusive. In certain embodiments, the wavelength of light irradiation is between approximately 900 nm and approximately 1000 nm, inclusive. In certain embodiments, the wavelength of light irradiation is within the ultraviolet range of the electromagnetic spectrum. The wavelength of ultraviolet irradiation is between approximately 10 nm and approximately 400 nm, inclusive. In certain embodiments, the ultraviolet light irradiation is between approximately 10 nm and approximately 100 nm, inclusive. In certain embodiments, the wavelength of the ultraviolet light is approximately 365 nm.

In certain embodiments, the altered properties are viscoelastic properties. In certain embodiments, the altered properties are mechanical properties. In certain embodiments, the altered properties are stress-relaxing properties. In certain embodiments, the altered properties are energy-dissipating properties. In certain embodiment, the altered properties are selected from the group consisting of stiffness, toughness, viscosity, elasticity, energy dissipation, dynamic modulus, complex modulus, storage modulus, loss modulus, plateau modulus, and relaxation time. In certain embodiments, the altered properties are measured by a rheometer.

Kits

In yet another aspect, the present disclosure describes kits. In certain embodiments, the kits are comprised of a polymer network comprised of multi-arm polymers covalently bound to ligand moieties which are coordinated to one or more metals; a photoinitiator; and optionally, instructions for use. In certain embodiments, the kits further comprise of one or more metals. In certain embodiments, the kits further comprise a light source, wherein the light has a wavelength in the range of about 10 nm to about 1000 nm.

In certain embodiments, the kits are comprised of multi-arm polymers covalently bound to a terminal group selected from the group consisting of halogen, optionally substituted alkenyl, optionally substituted alkynyl, optionally substituted heterocyclyl, optionally substituted aryl, optionally substituted heteroaryl, optionally substituted acyl, optionally substituted hydroxyl, optionally substituted amino, and optionally substituted thio; one or more reagents; one or more reactants; a photoinitiator; and optionally, instructions for use. In certain embodiments, the kits further comprise of one or more metals. In certain embodiments, the kits further comprise a light source, wherein the light has a wavelength in the range of about 10 nm to about 1000 nm.

Uses

The polymer networks described herein may be useful in a variety of applications. For example, the ability to control the stress-relaxing or energy-dissipating properties of polymer networks with light irradiation can provide useful materials such as adhesives, biomaterials, and coatings. In certain embodiments, the adhesives, biomaterials, and coatings are self-healing.

Additional uses will be self evident to one of ordinary skill in the art.

EXAMPLES

In order that the invention described herein may be more fully understood, the following examples are set forth. The synthetic examples described in this application are offered to illustrate the compounds and methods provided herein and are not to be construed in any way as limiting their scope.

Materials and Methods

All chemicals were purchased from Sigma-Aldrich unless otherwise noted.

Synthesis of 4PEG-His

4PEG-His was synthesized using appropriate modifications of the procedure by Fullenkamp et al., *Macromolecules*, 2013, 46, 1167-1174. Briefly: 1-5 g of four-arm PEG-NH$_2$.HCl (0.25 equivalents PEG, 1.0 equivalent —NH$_2$ groups) (JenKem USA) was mixed with N-α-Boc-N-tau-trityl-L-histidine (Boc-His(Trt)-OH) (1.5 equivalents) and (Benzotriazol-1-yloxy)tris(dimethylamino)phosphonium hexafluorophosphate (BOP) reagent (1.5 equivalents) and dissolved in 15 mL dichloromethane. N,N-Diisopropylethylamine (DIPEA) (535 equivalents) was added and the reaction was allowed to proceed for 2 hours under nitrogen gas (N$_2$). The product was purified by precipitation one time in diethyl ether, three times in methanol at −20° C., one time in diethyl ether, and then vacuum dried. Protecting groups were removed by a cleavage solution of 95 mL trifluoroacetic acid, 2.5 mL triisopropylsilane, and 2.5 mL H$_2$O for 2 hours. The solvent was removed under reduced pressure and the product purified by re-dissolving in methanol, precipitation three times in diethyl ether, and vacuum drying.

Synthesis of LAP Photoinitiator

Lithium phenyl-2,4,6-trimethylbenzoylphosphinate (also called lithium acylphosphinate. LAP) was synthesized according to literature procedures (see, e.g., Fairbanks et al., *Biomaterials*, 2009, 30, 6702-6707, Majima et al., *Die Makromolekulare Chemie*, 1991, 192, 2307-2315). To an N$_2$-purged round bottom schlenk flask, 0.952 mL (1.02 g, 6.0 mmol, 1.0 equivalent) dimethyl phenylphosphonite (from Alfa Aesar) was added. Under continuous stirring, 1.0 mL (1.10 g, 6.0 mmol, 1.0 equivalent) of 2,4,6-trimethyl benzoyl chloride (from Alfa Aesar) was added dropwise. The mixture was stirred for 18 h, when 2.08 g (24.0 mmol, 4.0 equivalents) LiBr (from Alfa Aesar) was dissolved in approximately 30 mL of 2-butanone (from Alfa Aesar), added to the reaction mixture, and the mixture was vented. The mixture was then heated to 50° C. via an oil bath, and after 10 minutes the solution became cloudy. The heat was removed, and after 3.5 hours, the solution had a paste-like consistency due to the precipitation of the product. Excess 2-butanone was added to ease handling of the mixture, and the precipitate was centrifuged and decanted with excess 2-butanone three times to remove unreacted precursors. The product was vacuum dried overnight. Final yield: 1.58 g, 5.37 mmol, 89.5% yield based on moles of precursors.

Figure 9A:
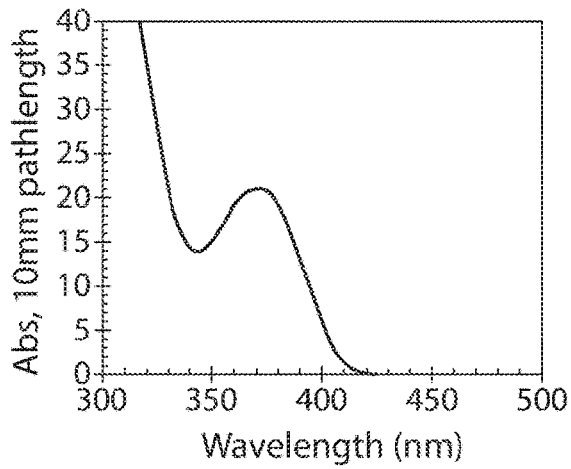
FIGS. 9A-9C show characterization of LAP photoinitiator.
Figure 9B:
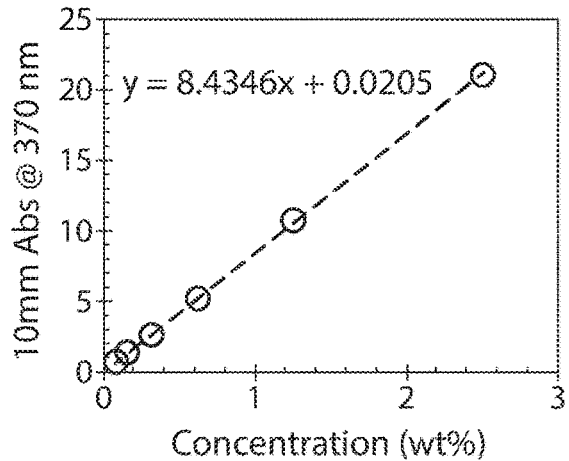
Figure 9C:
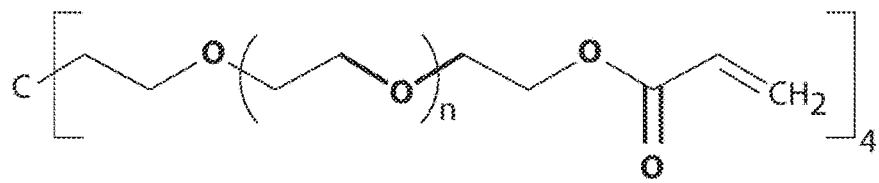
Figure 9C:
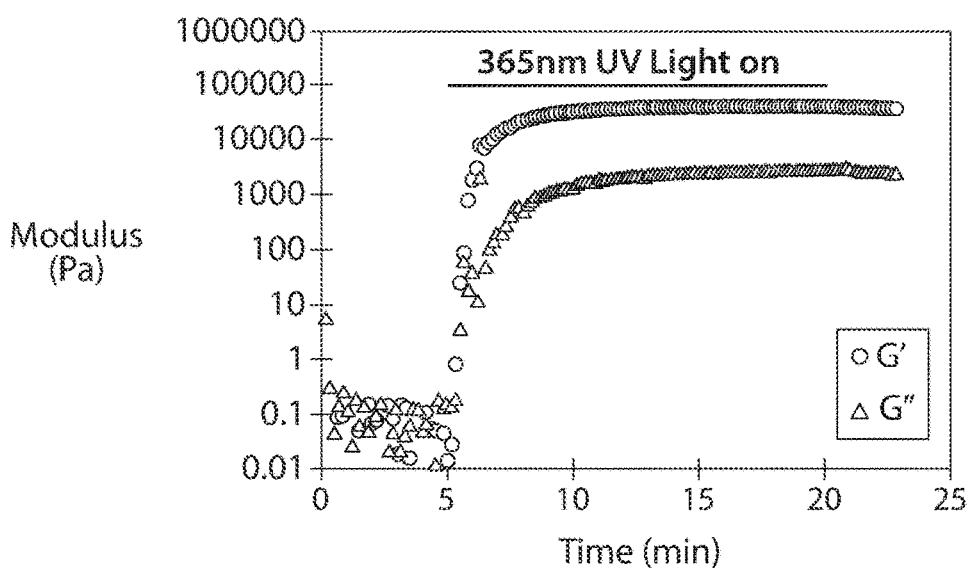

Solutions of the product in MilliQ H$_2$O show a strong absorbance peak at approximately 370 nm, corresponding to the established spectra of LAP (FIGS. 9A-9C). The activity of LAP was confirmed by using it to photocure a four-arm PEG-acrylate hydrogel. 10 kDa four-arm PEG-acrylate was purchased from JenKem USA and used as received. A 100 mg/mL four-arm PEG-acrylate solution in MilliQ H$_2$O with a 1:1 ratio of acrylate groups: LAP was loaded onto the rheometer, and the storage and loss moduli were measured at an angular frequency of 1 rad/s. After 5 minutes, the UV lamp was turned on, and the hydrogel reached full cure in the approximate time range of 5 to 10 minutes (FIGS. 9A-9C).

Polymer Network Formation

The polymer network was formed by mixing appropriate volumes of, in order: (1) 200 mg/mL solution of 4PEG-His in MilliQ H$_2$O, (2) 1.0 M solution of 3-(N-morpholino)

propanesulfonic acid (MOPS) buffer at pH 7.4, (3) MilliQ H$_2$O, (4) aqueous solution of LAP (briefly sonicated via bath sonicator to aid in dissolution), and (5) aqueous solution of NiCl$_2$.6H$_2$O, CuCl$_2$.2H$_2$O, or CoCl$_2$.6H$_2$O. The final buffer concentration was 0.2 M in polymer network. Upon adding the M$^{2+}$ solution, gelation (polymer network formation) was observed nearly instantaneously at the site of injection. Samples were thoroughly homogenized by vortex mixing, centrifuged for 5 minutes to remove air bubbles, and stored at room temperature in the dark for at least 12 h prior to characterization. This protocol allows for the formation of the polymer network in the presence of the photoinitiator, but avoids uncontrolled photo-dissociation of the photoinitiator.

Specifically, the resulting polymer network contain histidine ligand moieties groups that form relatively strong yet reversible bonds with certain metal ions (M$^{2+}$=Ni$^{2+}$, Co$^{2+}$, or Cu$^{2+}$), which transiently crosslink the polymers into a viscoelastic hydrogel. The ligand exchange kinetics between histidine and the metal ions primarily control the bulk network viscoelastic relaxation, and therefore the choice of metal drastically impacts the energy dissipative timescale(s) of the hydrogel (see e.g. Annable et al., *Journal of Rheology*, 1993, 37, 695; Grindy et al., *Nature Materials*, 2015, 14, 1210-1216; Loveless et al., *Macromolecules*, 2005, 38, 10171-10177; Yount et al., *Journal of the American Chemical Society*, 2005, 127, 14488-96; Fullenkamp et al., *Macromolecules*, 2013, 46, 1167-1174; Yount et al., *Angewandte Chemie*, 2005, 44, 2746-2748). Inspired by researchers using radical photoinitiators to reduce Cu$^{2+}$→Cu$^{1+}$ to catalyze the copper-catalyzed alkyne-azide (CuAAC) "click" reaction (see e.g. Adzima et al., *Nature Chemistry*, 2011, 3, 258-261; Gong et al., *Chemical Communications*, 2013, 49, 7950), to reduce Cu$^{2+}$→Cu$^0$ to form Cu nanoparticles (see e.g. Sakamoto et al., *Chemistry of Materials*, 2008, 20, 2060-2062), and using hydrogen peroxide to oxidize Co$^{2+}$→Co$^{3+}$ in 4PEG-His hydrogels (see e.g. Wegner et al., *Macromolecules*, 2016, 49, 4229-4235), the water-soluble photoinitiator lithium phenyl-2,4,6-trimethylbenzoylphosphinate (also called lithium acylphosphinate or LAP, FIG. 1) was introduced to the hydrogels to explore how changing the redox state of His:M$^{2+}$ complexes can affect viscoelastic mechanical properties. As shown in FIGS. 9A-9C, LAP has a strong absorption band between 350-400 nm. Irradiating LAP-laden hydrogels with ca. 365 nm radiation causes the LAP to dissociate (Fairbanks et al., *Biomaterials*, 2009, 30, 6702-6707), producing free radicals which can oxidize or reduce the metal centers of the 4PEG-His:M$^{2+}$ crosslinks. As discussed below, this change in oxidation state of the metal ion in the coordinate crosslinks can have significant effects on the bulk gel viscoelastic properties.

UV-Rheology Apparatus and Procedure

Figure 13:
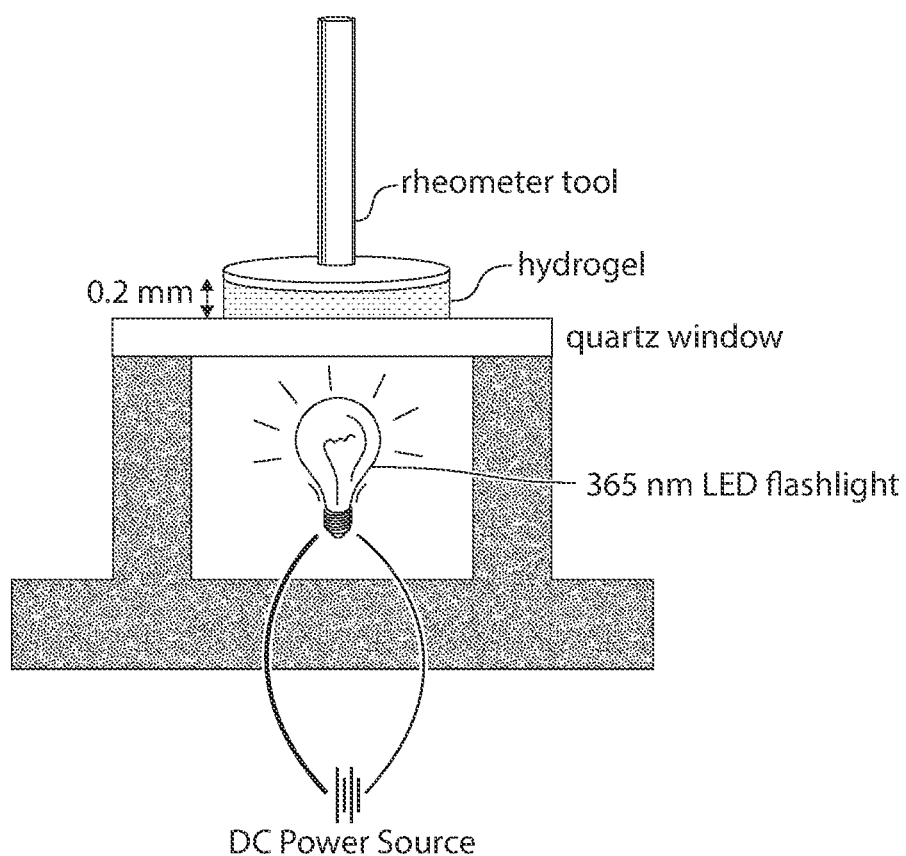
FIG. 13 shows the UV-rheology apparatus. The light source used is the "HQRP Longwave 12 LED UV Flashlight 365 nm" modified to be powered by a DC power source and to fit onto the rheometer.

For rheological measurements, polymer networks containing LAP were loaded on to a custom-built apparatus to irradiate samples while simultaneously measuring rheological properties, schematically outlined in FIG. 13. The light source used was an inexpensive hand-held 365 nm LED flashlight (HQRP Longwave 12 LED UV Flashlight 365 nm) modified to fit in the testing apparatus and powered by either a Hewlett Packard E3612A DC power supply or a Hewlett Packard 6212A DC power supply set in current-limiting mode to 30 mA. The operating voltage was approximately 3.2 V. Measurements were conducted on an Anton Paar MCR 302 stress-controlled rheometer in a parallel-plate geometry with a 25 mm-diameter plate and a 0.2 mm gap, at room temperature. Samples were first pre-sheared at γ=0.1 s$^{-1}$ for 5 minutes and rested for 5 minutes to erase memory of the loading history. A frequency sweep is then conducted at $\gamma_\theta$=5% strain amplitude to measure pre-irradiated rheological properties. The samples were then measured at a constant frequency ω=0.5 rad/s for M$^{2+}$=Ni$^{2+}$ samples or ω=1 rad/s for M$^{2+}$=Cu$^{2+}$, Co$^{2+}$ and all mixed-metal samples, and a constant strain amplitude $\gamma_0$=5% in the dark for 10 minutes, at which point the UV lamp was turned on for 1 hour. After 1 hour of irradiation, the UV lamp was turned off and mechanical properties were measured in the dark for 1 more hour. Finally, a second frequency sweep was conducted at $\gamma_0$=5% strain to establish post-irradiated rheological properties.

Results of Rheology Studies for Single-Metal Polymer Networks

Figures 2A, 2B, 2C:
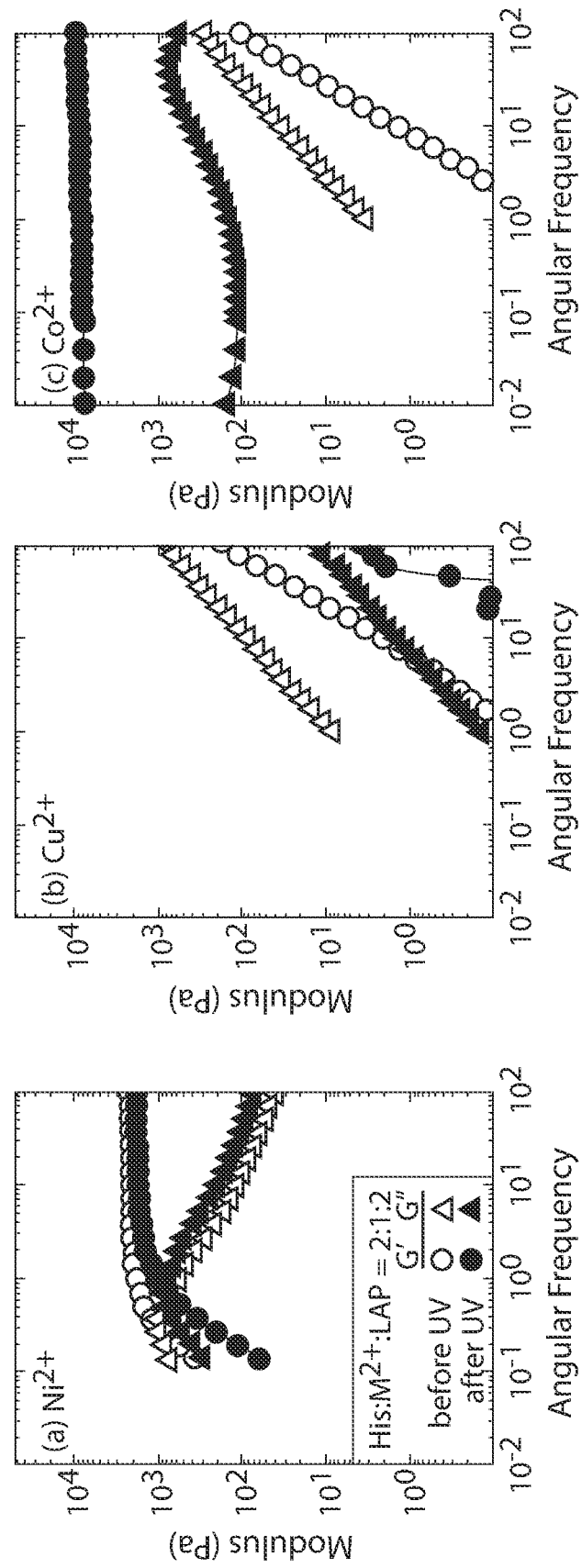
FIGS. 2A-2C show the viscoelastic moduli across an expanded frequency regime both pre- and post-UV treatment and highlights the extreme differences in response. $Ni^{2+}$-containing hydrogels are relatively unaffected, with a slight decrease in both plateau modulus $G_P$ (defined as $G'(\omega \to \infty)$) and relaxation time $\tau(\omega(G'=G''))^{-1})$ (FIG. 2A). In contrast, $Cu^{2+}$-based hydrogels become viscous fluids, with G' and G'' decreasing by several orders of magnitude (FIG. 2B). $Co^{2+}$-based gels stiffen substantially post-UV, and gain a low-frequency modulus which explains their solid-like behavior (FIG. 2C). A high-frequency resonant dissipation mode remains, although at lower frequencies (longer timescales) than the pre-UV hydrogels.

In FIG. 1, it is shown how 4PEG-His:M$^{2+}$ hydrogel stiffness (as measured by the magnitude of the complex shear modulus |G*|) responds to LAP+UV irradiation for each of the three metal ion crosslinks studied here. The three systems respond in drastically different ways: 4PEG-His:Co$^{2+}$ hydrogels stiffen by several orders of magnitude, 4PEG-His:Ni$^{2+}$ hydrogels are largely unaffected, and 4PEG-His:Cu$^{2+}$ hydrogels weaken significantly. In order to more completely understand the effects of the radicals generated from photo-dissociation of a photoinitiator on the hydrogels' viscoelastic mechanics, the entire material function is considered, the complex modulus G*(ω)=G'(ω)+iG''(ω) rather than just the value of the modulus at a single frequency. To do so, oscillatory rheology is used to measure the storage modulus (G') and loss modulus (G'') at different angular frequencies and thereby characterize the relevant energy dissipation timescales in the materials. The frequency where G'=G'' is an estimation of the dominant metal-coordinate crosslink resonant energy dissipation timescale T of the material. In FIGS. 2A-2C, it can be observed that the relaxation times of 4PEG-His:M$^{2+}$ hydrogels follow the pattern $\tau_{Ni} > \tau_{Co} > \tau_{Cu}$, corresponding with known trends of ligand dissociation rates (see, e.g., Helm et al., *Chemical Reviews*, 2005, 105, 1923-1960.).

Figure 10:
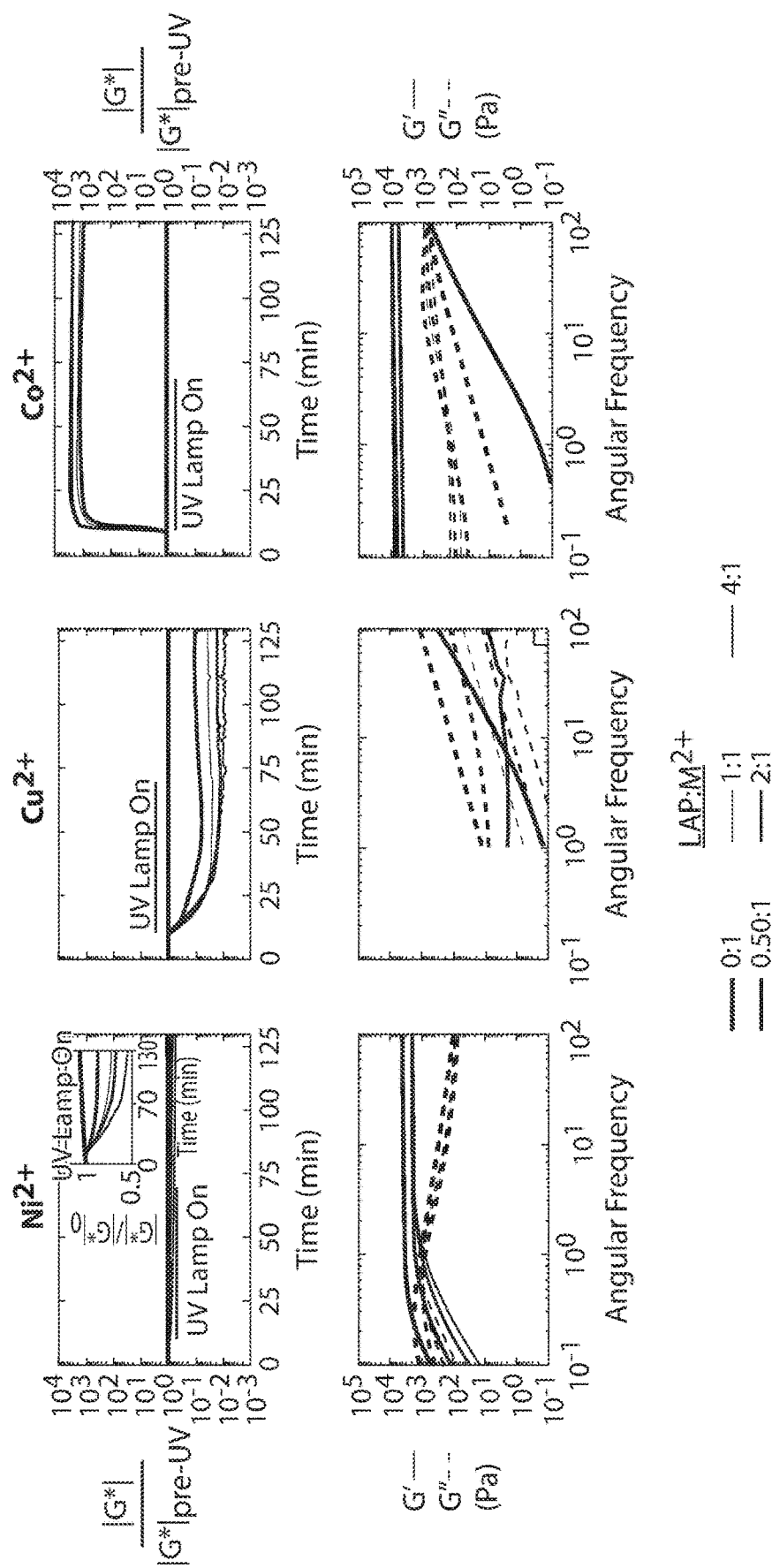
FIG. 10 shows mechanical properties of hydrogels with increased LAP loading. While using additional LAP further decreases the moduli and relaxation time of 4PEG-His:Ni hydrogels, the effect pales in comparison to the effects observed in Cu-crosslinked or Co-crosslinked hydrogels.

LAP has only small measurable effects on the rheological properties of 4PEG-His:Ni$^{2+}$ hydrogels as shown in FIG. 2A: UV irradiation only slightly decreases both the plateau modulus and relaxation time. Even at higher LAP concentrations, the relaxation time only drops from approximately 4 seconds before UV exposure to approximately 1 second after UV exposure (FIG. 10), which pales in comparison to the effects to the viscoelastic properties of 4PEG-His:Co$^{2+}$ or 4PEG-His:Cu$^{2+}$ crosslinked hydrogels upon UV irradiation.

Figure 11:
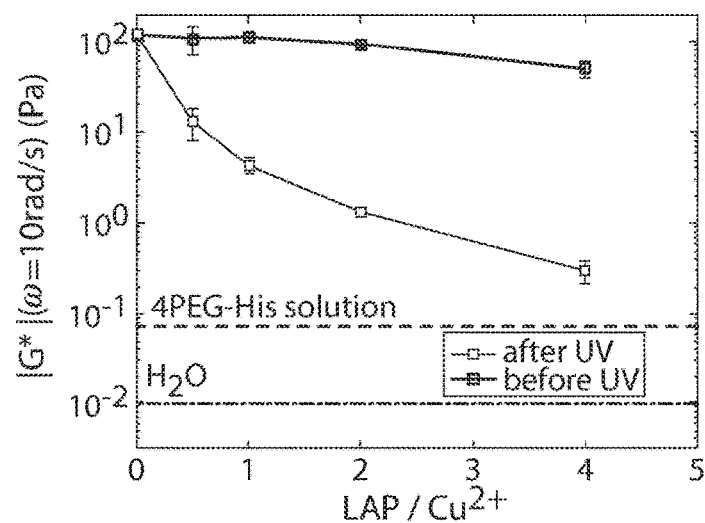
FIG. 11 shows LAP-concentration dependence of $|G^*|=\sqrt{G'^2+G''^2}$ at $\omega$=10 rad/s for 4PEG-His:Cu hydrogels. Even at the highest LAP loading measured here, the modulus of 4PEG-His:Cu hydrogels is still higher than the 4PEG-His solution itself, suggesting that His:Cu crosslinks still exist after UV irradiation. An estimate of the modulus of $H_2O$ is provided for reference (assuming $\eta_{H2O} \approx$ mPa·s).

As shown in FIG. 2B, the moduli of 4PEG-His:Cu$^{2+}$ gels decrease by several orders of magnitude after UV treatment, and as the LAP concentration is increased, the modulus approaches that of the un-crosslinked polymer solution (FIG. 11). The drastic change in mechanical properties is most likely caused by reduction of the Cu$^{2+}$ metal center to Cu$^+$.

Figure 12:
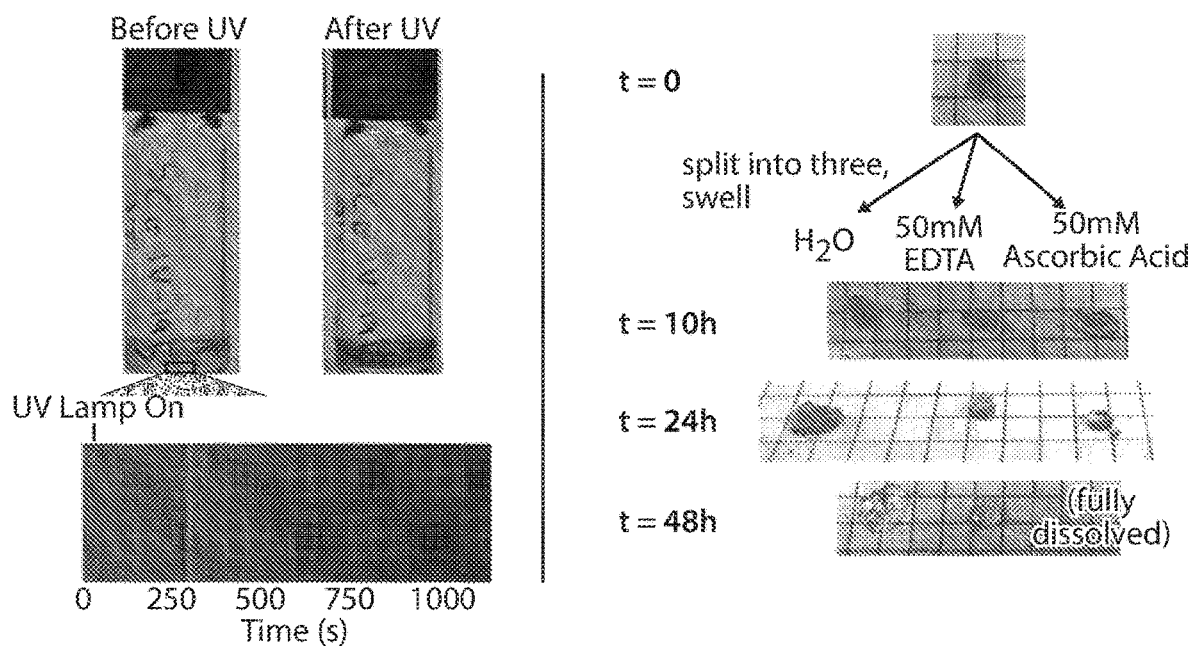
FIG. 12 shows evidence for $Co^{3+}$ oxidation. (left) UV irradiation distinctly changes the color of 4PEG-His:Co:LAP hydrogels. The lower figure zooms in on how the color changes over the course of UV irradiation. (right) Ascorbic acid reduces $Co^{3+}$, dissolving hydrogels significantly faster than EDTA. After 24 h, the hydrogel treated with ascorbic acid (a reducing agent) has lost its orange color, and after 48 h it is fully dissolved. In contrast, hydrogels treated with $H_2O$ or ethylenediaminetetraacetic acid (EDTA, a strong, broad-spectrum metal chelator) do not dissolve after 48 h.

In contrast to Cu$^{2+}$, the reaction of LAP with His:Co$^{2+}$ crosslinks causes a significant increase in gel moduli overall (G'(ω=100 rad/s) increases from ≈10$^3$ Pa to ≈10$^4$ Pa) and a dramatic viscoelastic fluid to solid transition evidenced by the flat storage modulus at low frequencies shown in FIG. 2C. As proposed by Wegner et al. (see e.g. Wegner et al., *Macromolecules*, 2016, 49, 4229-4235), this transition is likely caused by the oxidation of Co$^{2+}$→Co$^{3+}$ (FIG. 12) because the histidine ligand exchange kinetics are orders of magnitude slower for Co$^{3+}$ than Co$^{2+}$ complexes (see e.g. Helm et al., *Chemical Reviews*, 2005, 105, 1923-1960), and therefore His:Co$^{3+}$ crosslinks are effectively permanent in the frequency regime. Despite the plateau of G' at low frequencies, after UV irradiation the fast energy dissipation mode associated with His:Co$^{2+}$ crosslinks remains, as shown by the local maximum at ω≈50 rad/s in FIGS. 2A-2C, which suggests UV irradiation incompletely converts Co$^{2+}$ to Co$^{3+}$.

Figure 3:
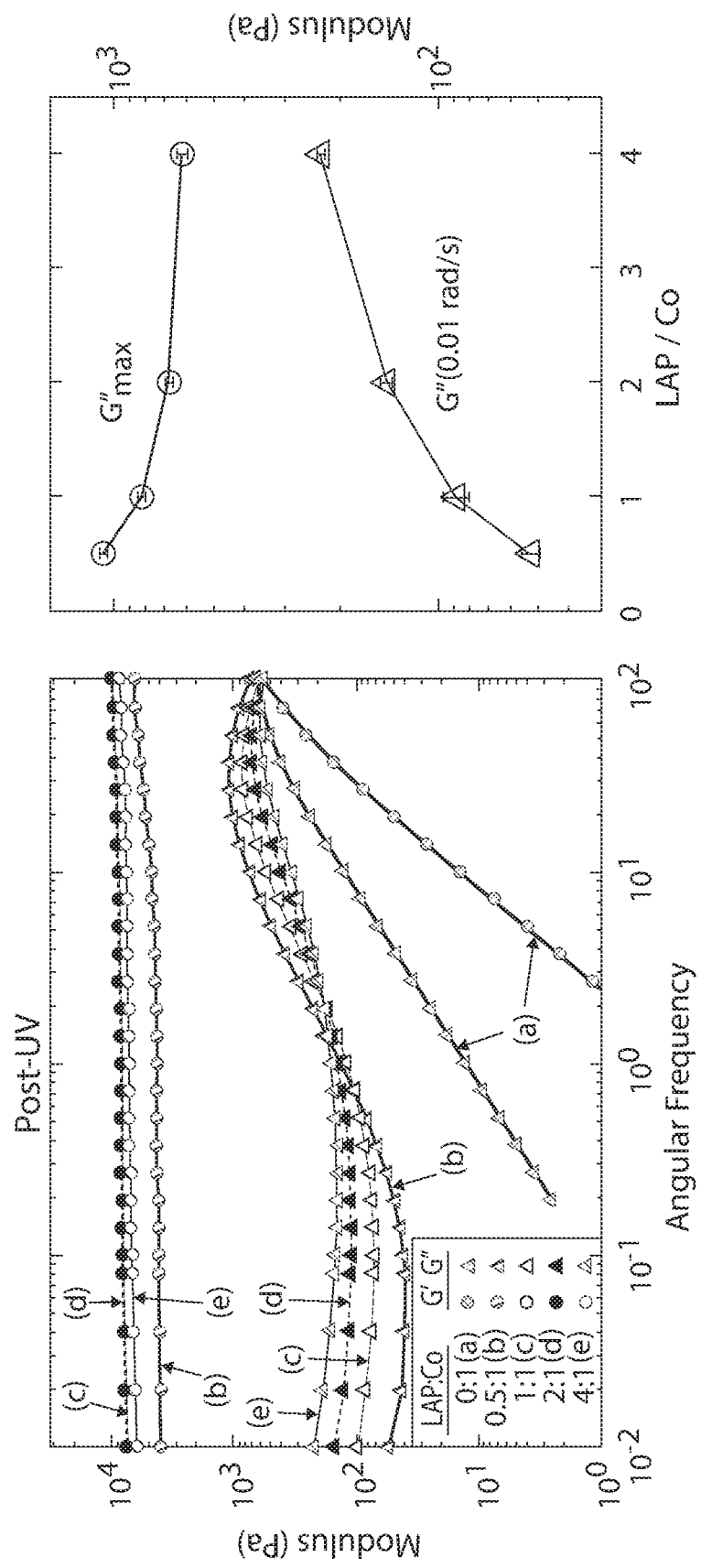
FIG. 3 shows that 4PEG-His:Co:LAP hydrogels stiffen dramatically under UV irradiation by gaining a low-frequency relaxation mode associated with His:$Co^{3+}$ crosslinks. However, the hydrogels maintain their resonant energy dissipation at higher frequencies, similar to the timescale associated with the His:$Co^{2+}$ crosslinks. This high-frequency energy dissipation decreases in magnitude with increasing LAP concentration, while low-frequency energy dissipation increases in magnitude as shown at right. Error bars show standard deviations of 3 measurements.

Further study of the rheological properties of 4PEG-His:Co hydrogels with different LAP concentrations support the conclusion that both His:Co$^{2+}$ and His:Co$^{3+}$ crosslinks are present after UV irradiation: the energy dissipation associated with His:Co$^{2+}$ crosslinks at ≥approximately 50-100 rad/s after UV irradiation decreases in magnitude with increasing LAP concentration, and the low-frequency loss modulus increases with increasing LAP:Co ratio (FIG. 3). This inverse relationship between G"(ω~10$^{-2}$) and G"(ω~10$^{2}$) suggests that increasing the LAP concentration oxidizes a higher fraction of Co$^{2+}$ to Co$^{3+}$, which accordingly decreases the magnitude of energy dissipation at ω approximately 50-100 rad/s.

Results of Rheology Studies for Double-Metal Polymer Networks

It has been shown that 4PEG-His transient network hydrogels with combinations of different metal ions generally have multiple characteristic relaxation timescales, and it was demonstrated how the relative contribution of these different relaxation modes to the viscoelastic material function can be tuned by simply controlling the metal ion composition (see, e.g., Grindy et al., *Nature Materials*, 2015, 14, 1210-1216). This is demonstrated in FIG. 4 for a selected set of metal ion compositions. It was observed that hydrogels with both a "fast" crosslink (His:Cu$^{2+}$, His:Co$^{2+}$) and a "slow" crosslink (His:Ni$^{2+}$) exhibit fast and slow relaxation modes that approximately correspond in timescale to that of the single-metal networks. On the other hand, hydrogels with two "fast" crosslinks (4PEG-His:Co$^{2+}$:Cu$^{2+}$) display viscoelastic properties that are difficult to distinguish from the pure single-metal networks due to the similarity in relaxation timescales of His:Cu$^{2+}$ and His:Co$^{2+}$ crosslinks.

Building on the demonstration that 4PEG-His:(Ni$^{2+}$), 4PEG-His:(Cu$^{2+}$), and 4PEG-His:(Co$^{2+}$) each respond in a drastically different way to radicals generated from photo-dissociation of a photoinitiator, double-metal ion hydrogels with various combinations of His:(Ni$^{2+}$, Cu$^{2+}$, Co$^{2+}$) were studied in the same manner. Below, it is shown how each pair of metal ions studied here can indeed be used in different proportions to program hydrogels with unique UV-switchable viscoelastic material functions.

4PEG-His:Ni:Cu

Figure 4:
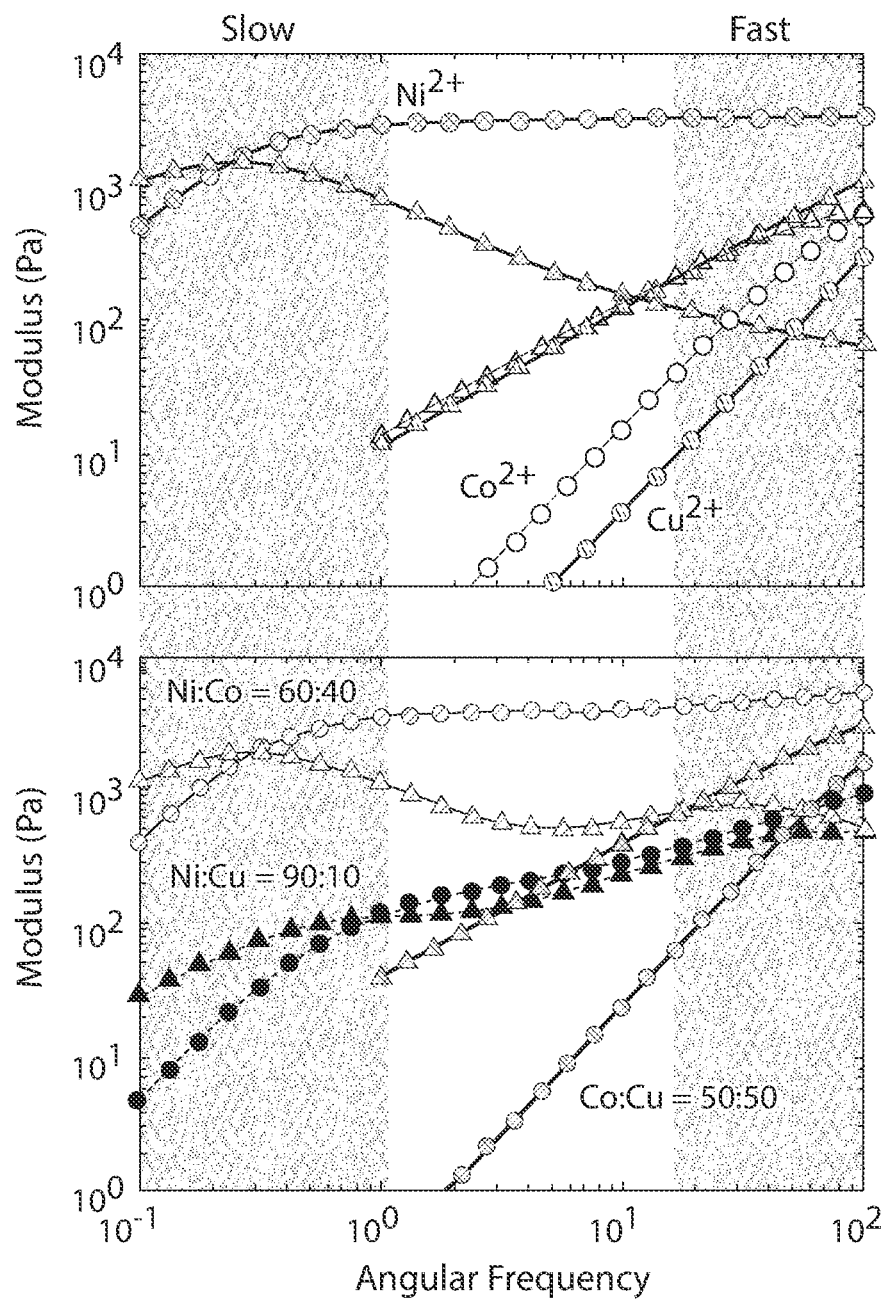
FIG. 4 shows that because the ligand exchange kinetics control the energy dissipation timescale, and the exchange kinetics vary by orders of magnitude depending on the metal ion, using combinations of metal ions results in hydrogels with multiple characteristic energy dissipation timescales. Here, hydrogels made with the three metal ion pairs are highlighted: $Ni^{2+}$:$Cu^{2+}$, $Ni^{2+}$:$Co^{2+}$, and $Co^{2+}$:$Cu^{2+}$. Because the ligand exchange kinetics for $Ni^{2+}$ complexes are ~100× slower than $Co^{2+}$ and $Cu^{2+}$, using $Ni^{2+}$ to crosslink 4PEG-His results in a relatively slow dissipation timescale, while $Co^{2+}$ or $Cu^{2+}$ result in hydrogels with much shorter, and similar, relaxation times. Hybrid hydrogels made with $Ni^{2+}$ and either $Co^{2+}$ or $Cu^{2+}$ show both slow and fast energy dissipation timescales. All hydrogels shown use a constant His:$M^{2+}$ ratio of 2:1.
Figure 5:
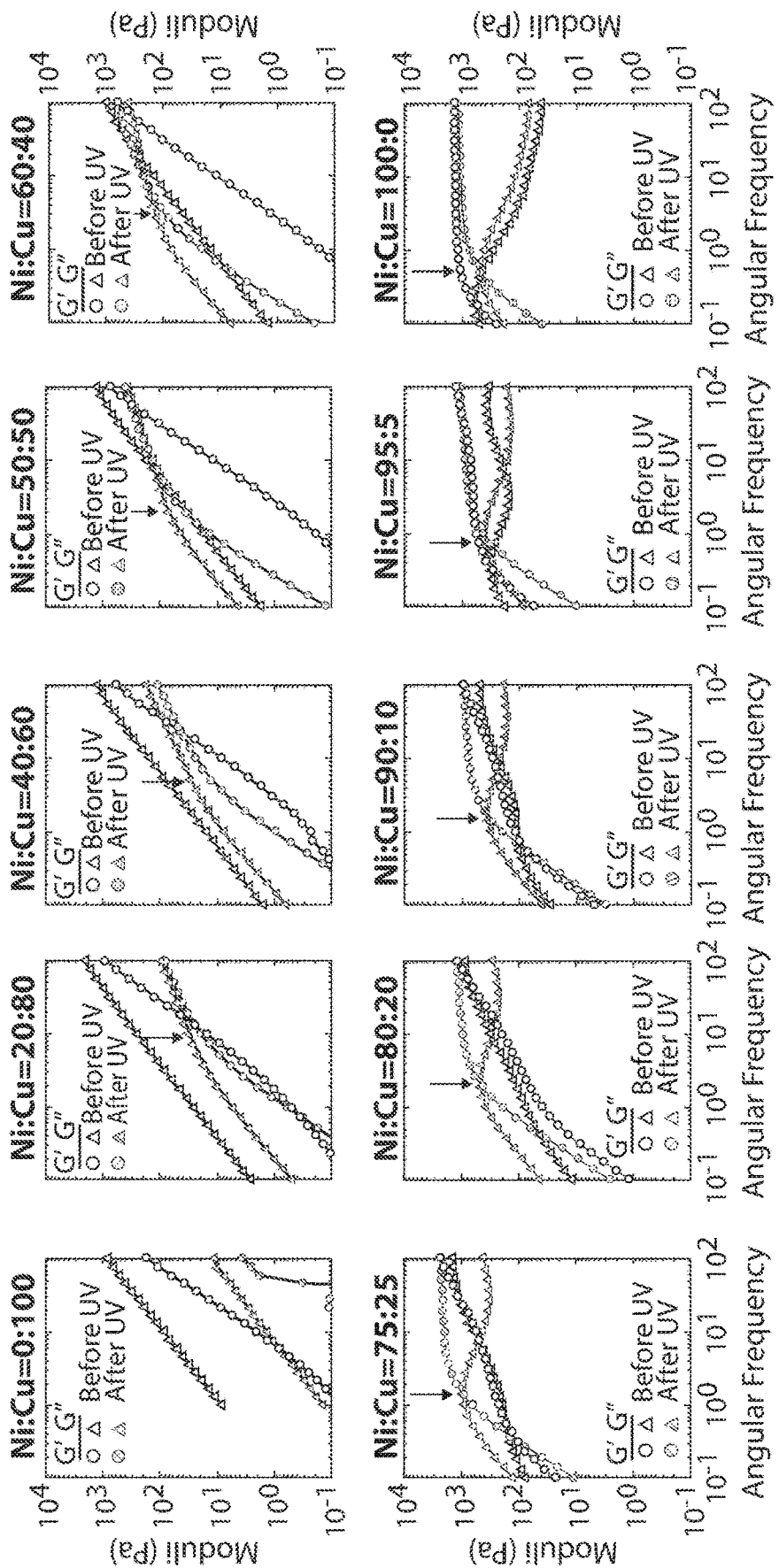
FIG. 5 shows that because His:Cu bonds are effectively removed with LAP+UV, Ni:Cu hydrogels with a small amount of Cu exhibit a fast relaxation mode that can be deleted with UV irradiation, leaving the slow $Ni^{2+}$-controlled mode to dominate the post-UV viscoelastic properties. In hydrogels with lower concentrations of $Ni^{2+}$, there is little evidence of a slow, $Ni^{2+}$-associated energy dissipation mode before UV irradiation. However, a new relaxation mode emerges in these hydrogels after UV irradiation which was associated with new His:$Ni^{2+}$ crosslinks forming when His ligands switch from coordinating Cu to coordinating Ni. Arrows indicate the approximate terminal relaxation time of the material as a guide to the eye. All hydrogels shown here use a constant His:$M^{2+}$:LAP ratio of 2:1:2.

As shown in FIG. 4 and FIG. 5, before UV irradiation 4PEG-His:Ni:Cu hydrogels exhibit two characteristic relaxation modes approximately corresponding to the relaxation timescales of 4PEG-His:Ni and 4PEG-His:Cu hydrogels, respectively. Of note is that, even at relatively small concentrations of Cu, the fast relaxation mode has a larger contribution to the modulus than its slow mode counterpart (viz. Ni:Cu=90:10 before UV irradiation, G"(50 rad/s)>G"(0.5 rad/s)). This is attributed to the relative coordinating strengths of the complexes, as His:Cu bonds are much stronger than His:Ni bonds: $K_1^{Ni} \approx 10^{6.64}$; $K_1^{Cu} \approx 10^{8.47}$, (see, e.g., Fullenkamp et al., *Macromolecules*, 2013, 46, 1167-1174) where $K_1^M$ is the equilibrium constant for the reaction His+M$^{2+}$→HisM$^{2+}$. Accordingly, in hydrogels with higher amounts of Cu (≥50%), the slower Ni-relaxation mode cannot be observed in the pre-UV rheological properties (FIG. 5, top).

Because 4PEG-His:Cu$^{2+}$ hydrogels significantly weaken upon reacting with radicals generated from photo-dissociation of a photoinitiator, while 4PEG-His:Ni$^{2+}$ hydrogels do not respond strongly to radicals, it should be expected that 4PEG-His:Ni:Cu hydrogels contain a fast relaxation mode that weakens significantly in response to UV irradiation. Indeed, this is what is observed in hydrogels with at least 90% Ni: the resonant energy dissipation peak at ω approximately 50 rad/s disappears (FIG. 5). However, the magnitude of the energy dissipation at the slow timescale associated with His:Ni crosslinks increases rather than remain constant as it does in 4PEG-His:Ni gels. A logical explanation for this observation is that as the radicals generated from photo-dissociation of a photoinitiator reduce Cu$^{2+}$→Cu$^{1+}$, His ligands switch from coordinating Cu to coordinating Ni. This increases the concentration of PEG chains crosslinked by a His:Ni$^{2+}$ crosslink, increasing the energy dissipation associated with His:Ni$^{2+}$ crosslinks. At lower Ni:Cu ratios (≤50% Ni), the terminal relaxation time after UV irradiation (identified approximately by the arrows in FIG. 5) is much slower than the relaxation time of the pre-UV hydrogels, again showing that UV irradiation increases the concentration of His:Ni$^{2+}$ crosslinks by effectively removing Cu$^{2+}$ crosslinks.

Figure 6:
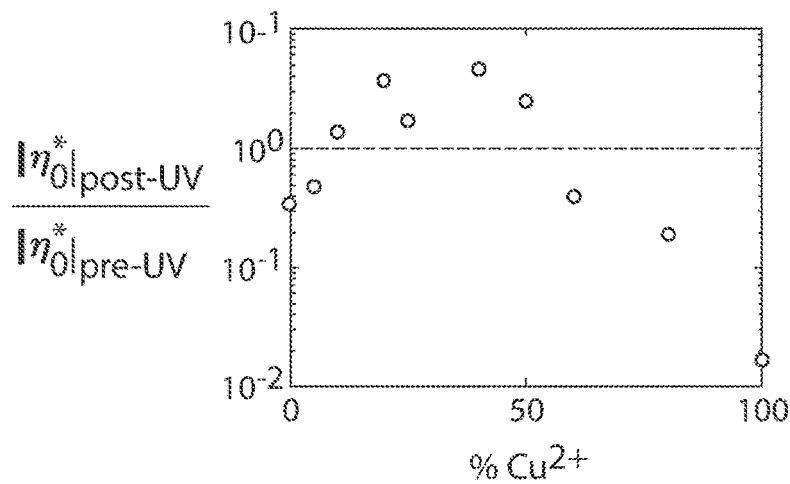
FIG. 6 shows that because UV irradiation can cause His ligands to switch from coordinating Cu to coordinating Ni, at intermediate Ni:Cu ratios, UV irradiation causes the terminal viscosity $|\eta_0^*|$ of the hydrogel to increase ($|\eta_0^*|_{post\text{-}UV}/|\eta_0^*|_{pre\text{-}UV} > 1$). At higher amounts of Cu, there are not enough His:Ni crosslinks to contribute mechanically to the network and removing His:Cu crosslinks via UV irradiation causes the viscosity to decrease.

Another way to examine this trend is to compare the change in terminal complex viscosity $|\eta_0^*| \equiv \lim_{\omega \to 0}(\sqrt{G'^2+G''^2}/\omega)$ of 4PEG-His:Ni:Cu hydrogels caused by UV irradiation. As shown in FIG. 6, at both high and low Ni:Cu ratios, $|\eta_0^*|$ decreases after UV irradiation, while at intermediate ranges of Ni:Cu ratio, the hydrogel's viscosity increases after UV irradiation. At high Ni:Cu ratios, the mechanics of the hydrogel are dominated by His:Ni crosslinks in both the pre-UV and post-UV state, and therefore UV irradiation causes the viscosity to decrease as it does in 4PEG-His:Ni$^{2+}$ hydrogels. At low Ni:Cu ratios, the viscosity decreases because the mechanics of the hydrogels are controlled by His:Cu bonds, which weaken significantly with UV irradiation and there are not enough His:Ni crosslinks to increase the viscosity. However, at intermediate Ni:Cu ratios. UV irradiation causes His ligands to switch from Cu to Ni, increasing the concentration of slow, His:Ni crosslinks and therefore increasing $|\eta_0^*|$.

4PEG-His:Ni:Co

Figure 7:
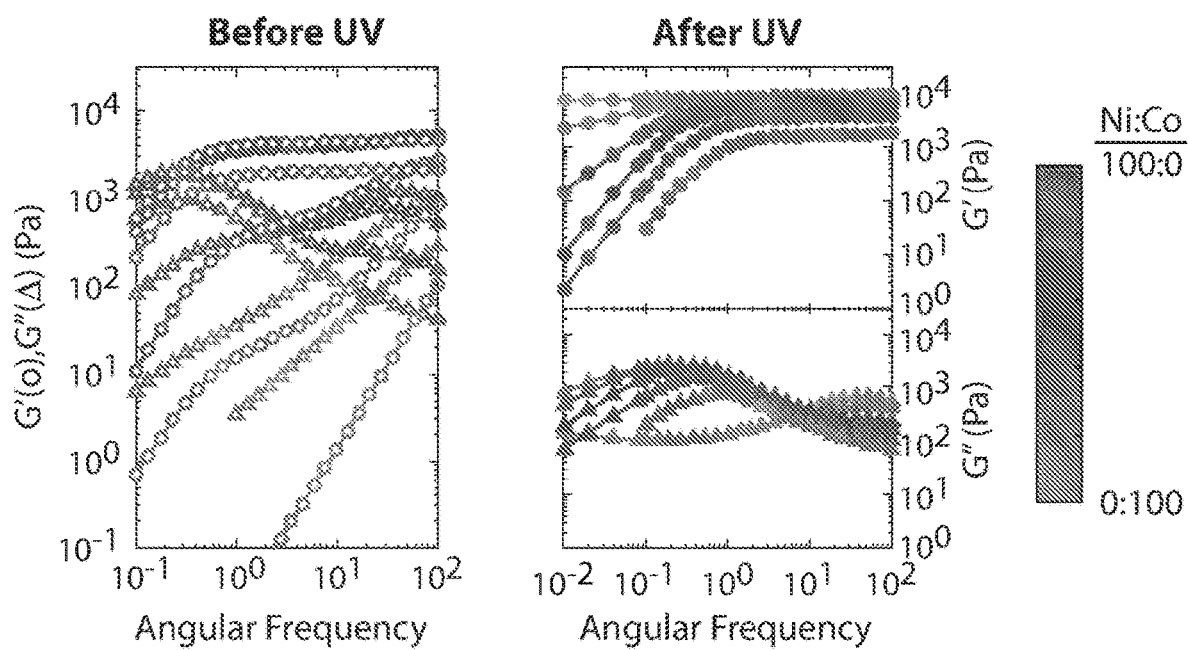
FIG. 7 shows that while 4PEG-His:Ni:Co hydrogels in the pre-UV state exhibit both a fast energy dissipation mode ($\omega$~50 rad/s) and slow energy dissipation mode ($\omega$~1 rad/s) similarly to 4PEG-His:Ni:Cu hydrogels, their viscoelastic material functions respond very differently to UV irradiation because His:Co crosslinks strengthen in response to oxidation, while His:Cu crosslinks weaken.

In a similar vein to 4PEG-His:Ni:Cu hydrogels, the pre-UV state of 4PEG-His:Ni:Co hydrogels exhibit two distinct relaxation times that correspond to the relaxation times in the single-metal hydrogels (FIG. 4 and FIG. 7). However, in contrast to 4PEG-His:Ni:Cu hydrogels, the fast relaxation time in 4PEG-His:Ni:Co hydrogels should be expected to become several orders of magnitude slower upon UV irradiation due to the radical-induced oxidation of Co$^{2+}$→Co$^{3+}$. As observed in FIG. 7, UV irradiation indeed results in an increase in G' at low frequencies, supporting the presence of a long-time relaxation mode associated with His:Co$^{3+}$ crosslinks.

Similar to 4PEG-His:Ni:Cu gels, in 4PEG-His:Ni:Co hydrogels the resonant energy dissipation mode corresponding to His:Ni crosslinks increases in magnitude post-UV, suggesting that His ligands may switch from coordinating Co to coordinating Ni. However, in contrast to 4PEG-His:Ni:Cu gels, in 4PEG-His:Ni:Co hydrogels the energy dissipation associated with His:Ni crosslinks increases as the concentration of Ni$^{2+}$ ions in the network is decreased. This is counterintuitive: in all of the other metal ion combinations studied here, the energy dissipation associated with a certain His:M crosslink is proportional to the concentration of that particular metal ion. This particular paradox supports the general idea that the amount of energy dissipation from a certain relaxation mode depends on the spatio-temporal network context in which it operates (e.g., the presence of other relaxation timescales in the material).

In further contrast with 4PEG-His:Ni:Cu where the fast energy dissipation mode is no longer present after UV irradiation, the energy dissipation mode at ω approximately 50 rad/s associated with His:Co$^{2+}$ crosslinks is still present in 4PEG-His:Ni,Co hydrogels after UV, which suggests that complete conversion of Co$^{2+}$→Co$^{3+}$ is not obtained.

4PEG-His:Co:Cu

Figure 8:
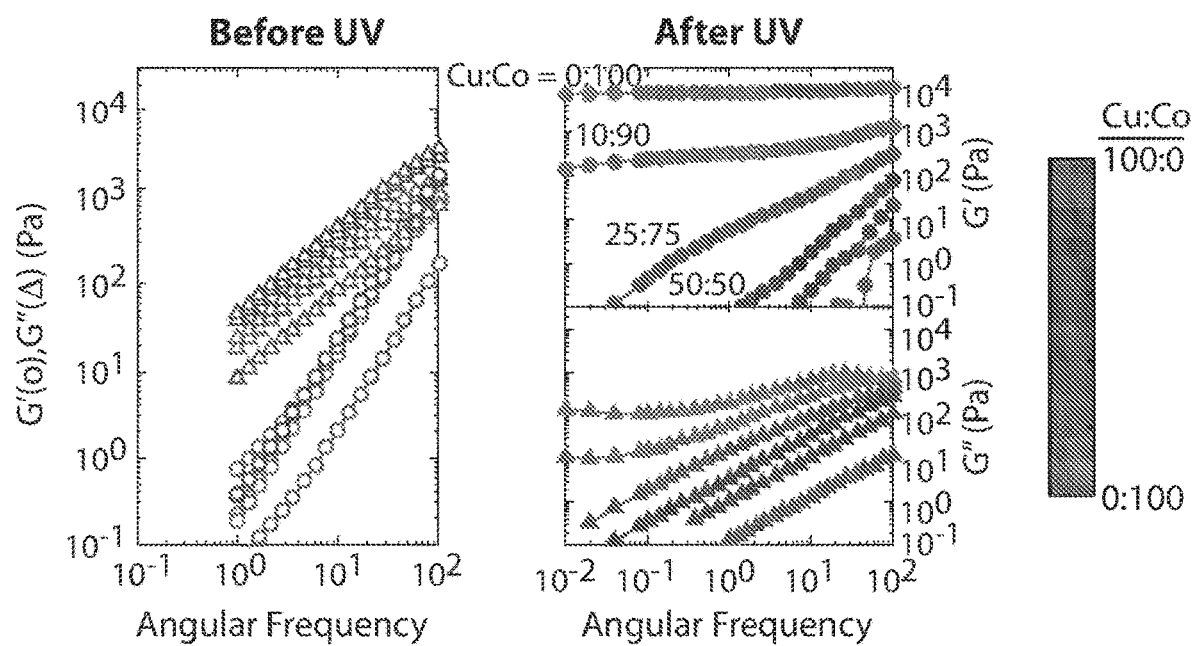
FIG. 8 shows that because Co and Cu have relatively similar pre-UV viscoelastic properties, mixtures of the two metals do not result in large shifts in moduli. However, they react very differently to photo-generated LAP radicals, as shown at right. Therefore, a wide array of post-UV viscoelastic property pairs can be achieved.

Prior to UV irradiation, the relaxation times of 4PEG-His:Co and 4PEG-His:Cu hydrogels are relatively similar, with τ≈0.01 seconds. Therefore, unlike the previously discussed 4PEG-His:Ni:(Cu or Co) hydrogels, mixtures of $Co^{2+}$ and $Cu^{2+}$ do not result in two clearly identifiable viscoelastic energy dissipation timescales and hydrogels made with mixtures of Co:Cu crosslinks resemble the viscoelastic properties of hydrogels made entirely with $Co^{2+}$ or $Cu^{2+}$ (as shown in FIG. 4 and FIG. 8). However, because His:$Co^{2+}$ and His:$Cu^{2+}$ bonds react in opposite ways to the radicals generated from photo-dissociation of a photoinitiator, significantly different viscoelastic properties should be expected after UV irradiation: samples with His:Co crosslinks should grow a low-frequency modulus associated with His:$Co^{3+}$ crosslinks, and this low-frequency modulus should be proportional to the Co concentration in the hydrogel. Samples with His:Cu crosslinks should have a high-frequency energy dissipation mode which disappears upon UV irradiation. This behavior is confirmed in FIG. 8: the low-frequency modulus associated with the His:$Co^{3+}$ crosslink scales with Co:Cu ratio. As was the case for 4PEG-His:Ni:Cu hydrogels before UV irradiation, a small amount of Cu displays a disproportionate effect. Even in hydrogels with only 10% Cu, the low-frequency post-UV storage modulus is diminished by over an order of magnitude, and with Cu content as high as 25% the low-frequency relaxation is barely noticeable. The fact that a relatively small amount of $Cu^{2+}$ in the network has a disproportionate effect on the viscoelastic properties may be caused by the large disparity in coordinating energies of His:$Cu^{2+}$ and His:$Co^{2+}$ complexes: $K_1(His:Cu^{2+}) \approx 10^{8.47} \gg K_1(His:Co^{2+}) \approx 10^{4.99}$, (see, e.g., Fullenkamp et al., *Macromolecules*, 2013, 46, 1167-1174) so His ligands strongly prefer to coordinate Cu rather than Co. Regardless of the specific details, 4PEG-His:Co:Cu hydrogels represent a family of hydrogels with very similar pre-UV irradiation viscoelastic material functions (regardless of the Co:Cu ratio), yet vastly different post-UV irradiation viscoelastic material functions which strongly depends on the Co:Cu ratio.

The results in FIGS. 5-8 explicitly show that judicious choice of the transition metal ions used to crosslink 4PEG-His networks can be used as a strategy to control energy dissipation timescales in both the pre-UV and post-UV state. Of the different chemistries discussed here, three distinct energy dissipation timescales can be controlled: $\omega \ll 10^{-2}$ rad/s, $\omega$ approximately $10^{-1}$ rad/s, and $\omega$ approximately $10^{2}$ rad/s. The mapping of which sets of metal ions and UV treatments correspond to which sets of energy dissipation timescales is outlined in Table 1.

TABLE 1

Each pair of metal ions uniquely control the possible viscoelastic material functions, both before UV irradiation and after UV irradiation.

| | | Dissipation at | | |
|---|---|---|---|---|
| | | $\omega \ll 10^{-2}$ | $\omega \sim 10^{-1}$ | $\omega \sim 10^{2}$ |
| | | | controlled by | |
| Ni:Cu | Before UV | — | [Ni] | [Cu] |
| | After UV | — | [Ni] | — |
| Ni:Co | Before UV | — | [Ni] | [Co] |
| | After UV | [Co] | [Ni], [Co] | [Co] |
| Co:Cu | Before UV | — | — | [Co], [Cu] |
| | After UV | [Co] | — | [Co] |

Ascorbic Acid Treatment of Histidine Methyl Ester:Cu Complexes

Histidine methyl ester (HisOMe):Cu solutions were prepared in 0.2 M MOPS buffer at pH 7.4, with final concentrations [HisOMe]=0.04 M, [$CuCl_2 \cdot 2H_2O$]=0.02 M, with 0, 1, or 2 equivalents of ascorbic acid per Cu ion. The samples were mixed, sealed in centrifuge tubes, and left to react for 30 min, after which absorption spectra were taken.

Dissolution of 4-PEG-His:Co Hydrogels

A 4PEG-His:Co:LAP hydrogel, using a His:Co:LAP ratio of 2:1:2 (previously used for rhoeological testing) was split into three pieces using a razor blade and each piece was immersed in 0.5 mL (i) MilliQ $H_2O$, (ii) 50 mM ethylenediaminetetraacetic acid (a broad-spectrum metal chelator), or (iii) 50 mM ascorbic acid (a reducing agent). The samples were stored at room temperature, and solutions were replaced after 10 h, 24 h, and 48 h (see FIG. 12).

EQUIVALENTS AND SCOPE

In the claims articles such as "a," "an," and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context. The invention includes embodiments in which exactly one member of the group is present in, employed in, or otherwise relevant to a given product or process. The invention includes embodiments in which more than one, or all of the group members are present in, employed in, or otherwise relevant to a given product or process.

Furthermore, the invention encompasses all variations, combinations, and permutations in which one or more limitations, elements, clauses, and descriptive terms from one or more of the listed claims is introduced into another claim. For example, any claim that is dependent on another claim can be modified to include one or more limitations found in any other claim that is dependent on the same base claim. Where elements are presented as lists, e.g., in Markush group format, each subgroup of the elements is also disclosed, and any element(s) can be removed from the group. It should it be understood that, in general, where the invention, or aspects of the invention, is/are referred to as comprising particular elements and/or features, certain embodiments of the invention or aspects of the invention consist, or consist essentially of, such elements and/or features. For purposes of simplicity, those embodiments have not been specifically set forth in haec verba herein.

It is also noted that the terms "comprising" and "containing" are intended to be open and permits the inclusion of additional elements or steps. Where ranges are given, endpoints are included. Furthermore, unless otherwise indicated or otherwise evident from the context and understanding of one of ordinary skill in the art, values that are expressed as ranges can assume any specific value or sub-range within the stated ranges in different embodiments of the invention, to the tenth of the unit of the lower limit of the range, unless the context clearly dictates otherwise.

This application refers to various issued patents, published patent applications, journal articles, and other publications, all of which are incorporated herein by reference. If there is a conflict between any of the incorporated references and the instant specification, the specification shall control. In addition, any particular embodiment of the present invention that falls within the prior art may be explicitly excluded from any one or more of the claims. Because such embodiments are deemed to be known to one of ordinary skill in the art, they may be excluded even if the exclusion is not set forth explicitly herein. Any particular embodiment of the invention can be excluded from any claim, for any reason, whether or not related to the existence of prior art.

Those skilled in the art will recognize or be able to ascertain using no more than routine experimentation many equivalents to the specific embodiments described herein. The scope of the present embodiments described herein is not intended to be limited to the above Description, but rather is as set forth in the appended claims. Those of ordinary skill in the art will appreciate that various changes and modifications to this description may be made without departing from the spirit or scope of the present invention, as defined in the following claims.

What is claimed is:

1. A method for altering the properties of a polymer network comprising exposing the polymer network to ultraviolet (UV) light in the presence of a photoinitiator;
   wherein the photoinitiator is an organic small molecule;
   wherein the polymer network is comprised of polymers non-covalently crosslinked by coordination of the polymers to metals; and
   wherein the metals undergo oxidation and/or reduction reactions upon exposure to ultraviolet (UV) light in the presence of the photoinitiator.

2. The method of claim 1, wherein the resulting polymer network upon exposure to ultraviolet (UV) light forms a hydrogel.

3. The method of claim 1, wherein the altered properties are selected from the group consisting of stiffness, toughness, viscosity, elasticity, energy dissipation, dynamic modulus, complex modulus, storage modulus, loss modulus, plateau modulus, and relaxation time.

4. The method of claim 1, wherein the polymers are multi-arm polymers.

5. The method of claim 4, wherein the polymers are four-arm polymers.

6. The method of claim 1, wherein the polymers are of the formula:

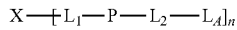

wherein:
   X is carbon, silicon, nitrogen, oxygen, sulfur, optionally substituted alkyl, optionally substituted heteroalkyl, optionally substituted carbocyclyl, optionally substituted heterocyclyl, optionally substituted aryl, optionally substituted heteroaryl, optionally substituted alkoxy, or a combination thereof;
   each $L_1$ and $L_2$ are independently optionally substituted, cyclic or acyclic, branched or unbranched aliphatic; optionally substituted, cyclic or acyclic, branched or unbranched heteroaliphatic; optionally substituted aryl; optionally substituted heteroaryl, or a combination thereof;
   each P is independently a linear or branched, homopolymer or copolymer, or a combination thereof, having a number average molecular weight of about 100 Da to 60000 Da;
   each $L_A$ is independently a ligand moiety that coordinates to a metal; and
   n is an integer between 2 and 4, inclusive.

7. The method of claim 6, wherein X is a carbon.

8. The method of claim 6, wherein $L_1$ is unsubstituted, acyclic, unbranched heteroaliphatic.

9. The method of claim 6, wherein $L_2$ is unsubstituted, acyclic, unbranched heteroaliphatic.

10. The method of claim 6, wherein P is a linear homopolymer or linear copolymer.

11. The method of claim 6, wherein n is 4.

12. The method of claim 6, wherein each $L_A$ is independently selected from the group consisting of proteins, polysaccharides, nucleic acids, amino acids, organic diacids, polypeptides, amines, thiols, ethers, alcohols, polyacids, polyamines, heterocycles, and heteroaryls.

13. The method of claim 6, wherein each $L_A$ is histidine.

14. The method of claim 1, wherein the polymers are of the formula:

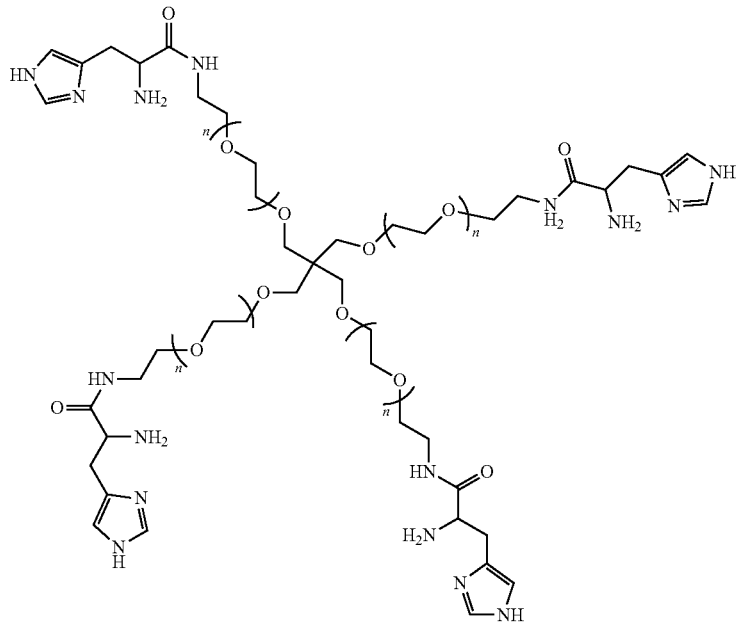

wherein each n is independently between 1 and 100, inclusive.

15. The method of claim 1, wherein the metals are selected from the group consisting of copper, nickel, cobalt, and combinations thereof.

16. The method of claim 1, wherein the wavelength of the ultraviolet (UV) light is between approximately 100 nm and approximately 400 nm, inclusive.

17. The method of claim 1, wherein the photoinitiator is selected from the group consisting of benzoin ethers, benzyl ketals, α-dialkoxyacetophenones, α-hydroxyalkylphenones, α-amino alkylphenonones, acylphophine oxides, acylphosphinates, azobisisobutyronitrile, 1,1'-azobis(cyclohexanecarbonitrile), di-tert-butyl peroxide, benzoyl peroxide, methyl ethyl ketone peroxide, and acetone peroxide.

18. The method of claim 1, wherein the photoinitiator undergoes photo-dissociation to generate free radicals upon exposure to ultraviolet (UV) light.

19. The method of claim 18, wherein the free radicals effect oxidation or reduction of the metals.

20. The method of claim 1, wherein the metals are a combination of nickel and copper, a combination of nickel and cobalt, or a combination of cobalt and copper.

21. The method of claim 1, wherein the wavelength of the ultraviolet (UV) light is between approximately 300 nm and approximately 400 nm, inclusive.

22. The method of claim 1, wherein the photoinitiator is an acylphosphinate.

23. The method of claim 1, wherein the photoinitiator is lithium phenyl-2,4,6-trimethylbenzoylphosphinate (LAP).

* * * * *